(12) United States Patent
Lizotte

(10) Patent No.: US 7,016,117 B2
(45) Date of Patent: Mar. 21, 2006

(54) RADIALLY NON-SYMMETRIC BEAM FORMING ELEMENTS FOR CORRECTION OF ENERGY PROFILE DISTORTION DUE TO LATERAL BEAM DRIFT

(75) Inventor: Todd E. Lizotte, Manchester, NH (US)

(73) Assignee: Hitachi Via Mechanics, Ltd., Ebina (JP)

(*) Notice: Subject to any disclaimer, the term of this patent is extended or adjusted under 35 U.S.C. 154(b) by 0 days.

(21) Appl. No.: 11/020,914

(22) Filed: Dec. 22, 2004

(65) Prior Publication Data

US 2005/0162746 A1    Jul. 28, 2005

Related U.S. Application Data

(63) Continuation-in-part of application No. 10/958,712, filed on Oct. 5, 2004, which is a continuation-in-part of application No. 10/411,570, filed on Apr. 10, 2003, now Pat. No. 6,853,489.

(51) Int. Cl.
*G02B 27/14* (2006.01)

(52) U.S. Cl. .................. 359/637; 359/618; 372/33; 372/101

(58) Field of Classification Search .............. 359/16, 359/554, 618, 637; 372/33, 101
See application file for complete search history.

(56) References Cited

U.S. PATENT DOCUMENTS

| 5,148,317 | A  | * | 9/1992 | Foresi ................. 359/566 |
| 5,486,694 | A  |   | 1/1996 | Harris |
| 6,075,650 | A  |   | 6/2000 | Morris et al. |
| 6,922,286 | B1 | * | 7/2005 | Brown ................. 359/566 |

* cited by examiner

*Primary Examiner*—Hung Xuan Dang
*Assistant Examiner*—Joseph Martinez
(74) *Attorney, Agent, or Firm*—Davis & Bujold, P.L.L.C.

(57) ABSTRACT

A radially non-symmetric beamforming element for transforming the input energy profile of an input laser beam subject to lateral shift that is variable in radial direction and magnitude into a desired output energy profile of an output laser beam. The beam forming element includes an optical element having a profile transformation function that includes a first profile transformation function for transforming the input energy profile into the desired output energy profile and a profile correction transformation function superimposed on the first profile transformation function for modifying the first profile transformation function to correct distortions in the output energy profile introduced be a lateral shift of the input laser beam. The profile correction transformation function includes a deficiency profile transformation function or a hotspot profile transformation function and an optical axis of the optical element is aligned parallel to the beam axis of the input laser beam and is offset from an unshifted beam axis of the input laser beam by a distance proportionate to a maximum expected lateral shift of the beam axis of the input laser beam.

8 Claims, 19 Drawing Sheets

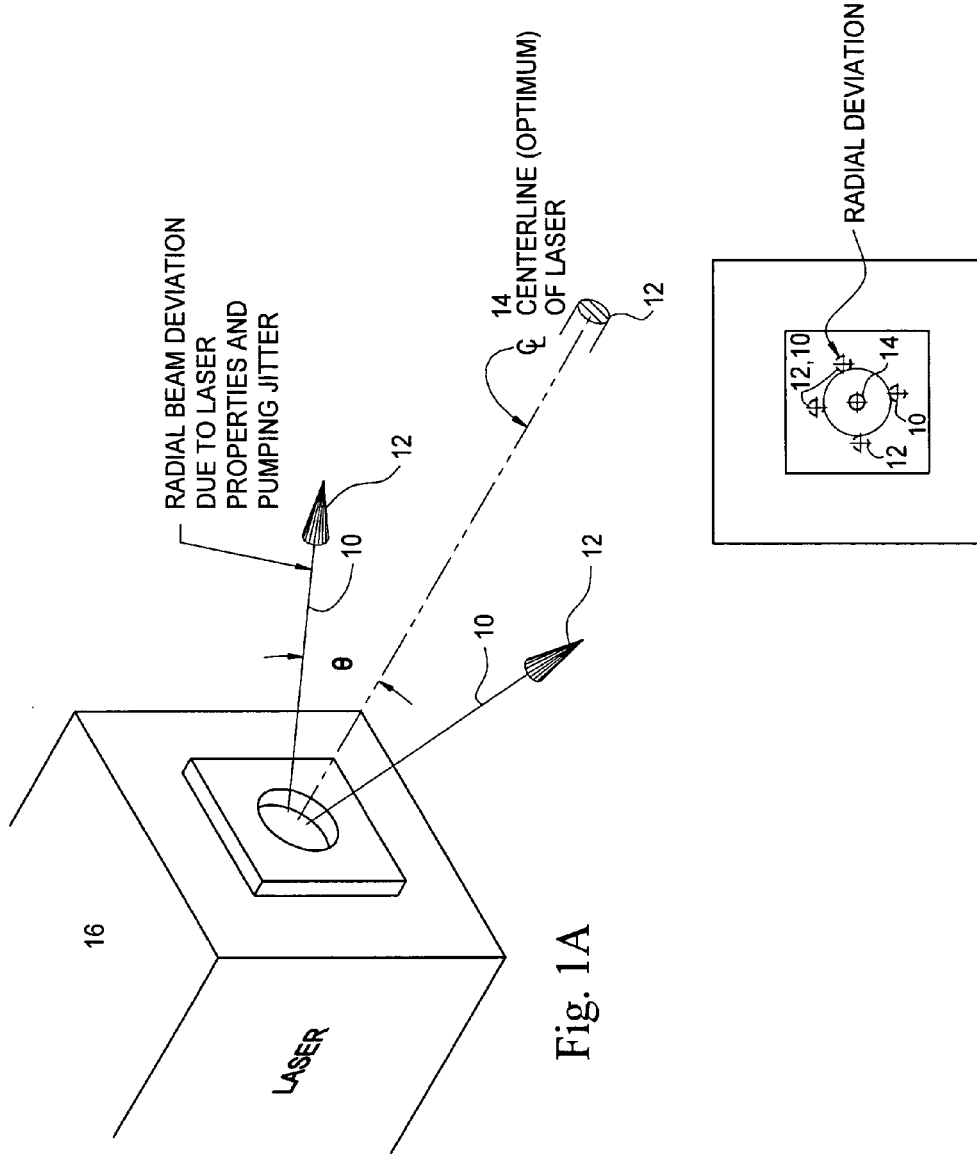

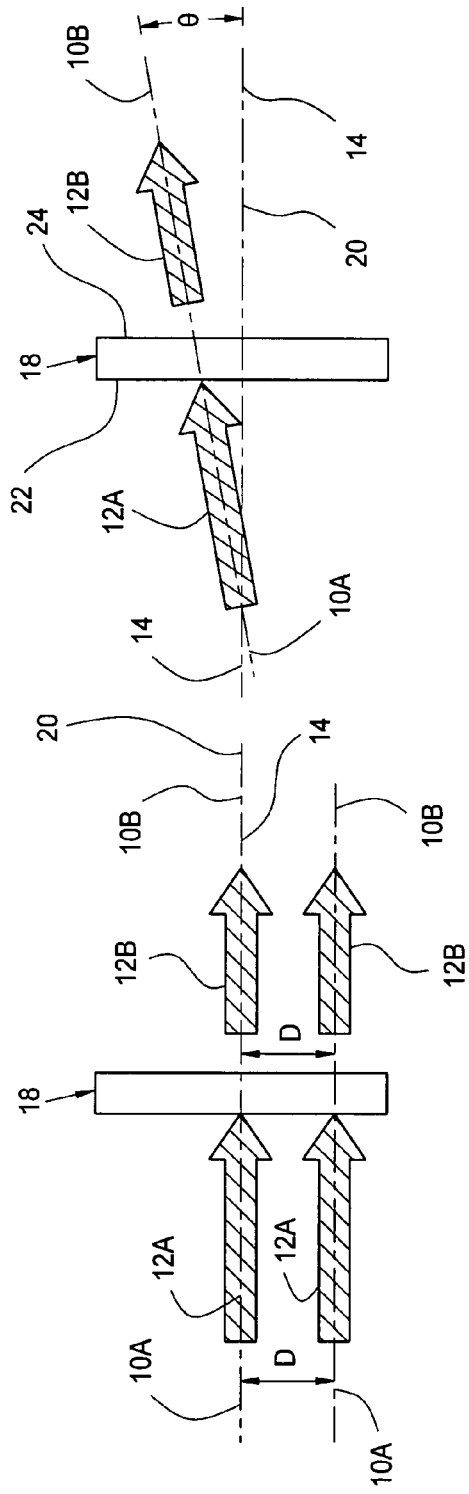
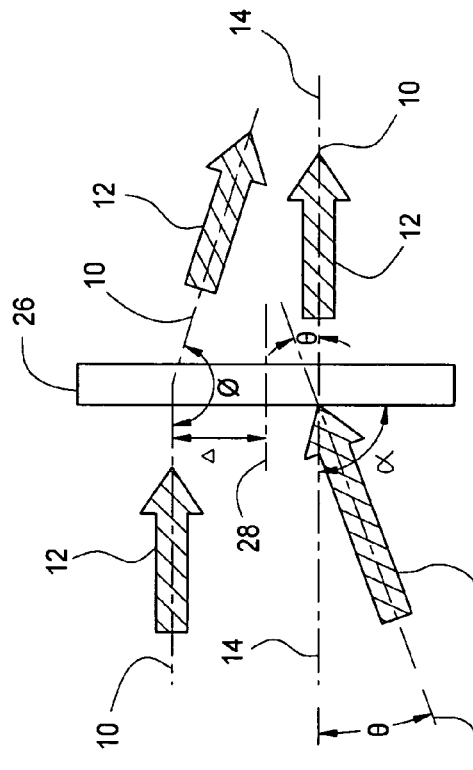
Fig. 3A  Fig. 3B  Fig. 5

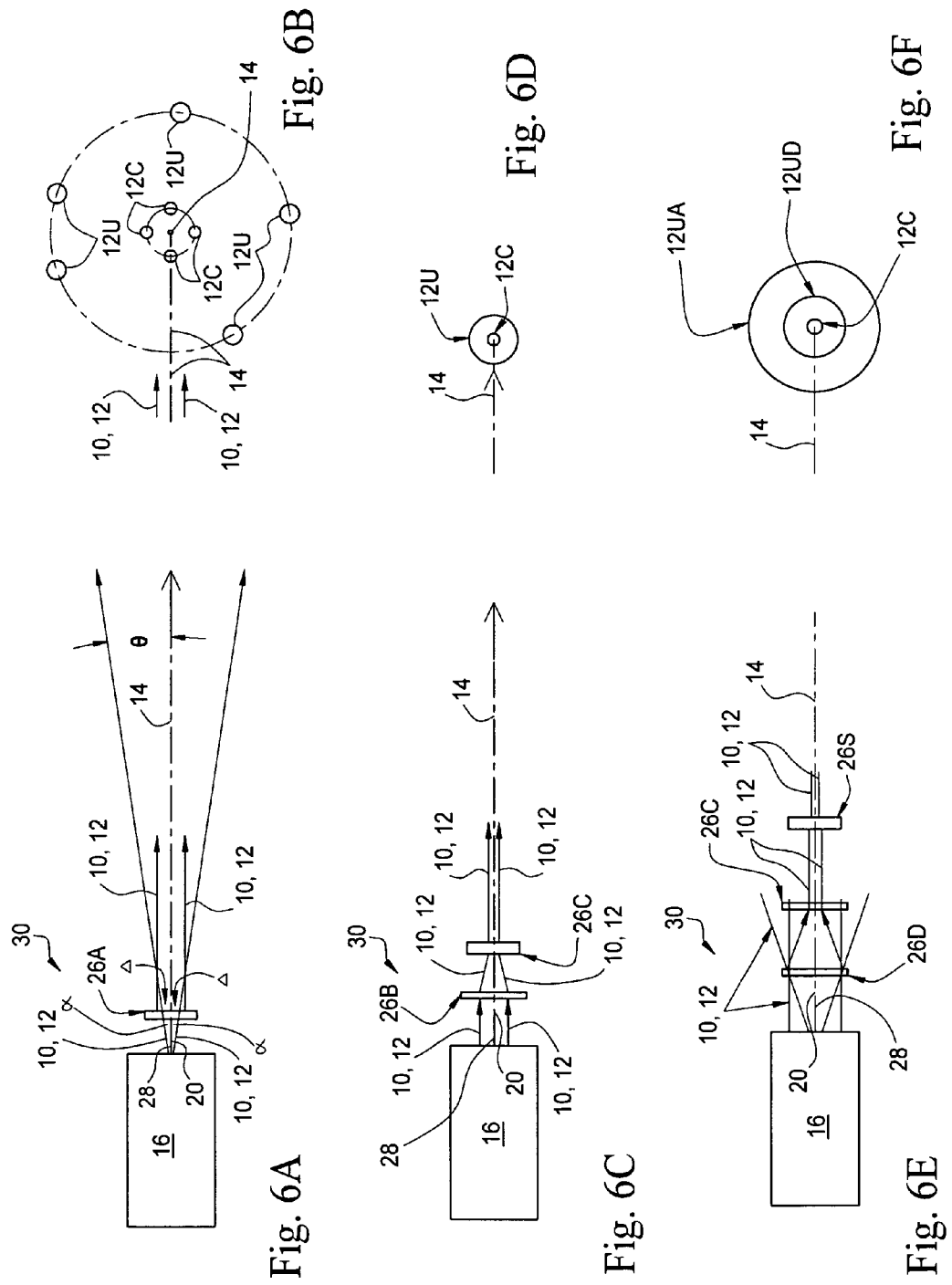

PATENT DIAGRAM
① MFDOE OR MFHOE OR MFCGH OR MFFZP
"MULTI-FUNCTION DIFFRACTIVE OPTICAL ELEMENT"
"INTEGRATED MULTI-FUNCTION DIFFRACIVE OPTICAL ELEMENT"

RADIALLY NON-SYMMETRIC BEAM FORMING ELEMENTS FOR CORRECTION OF ENERGY PROFILE DISTORTION DUE TO LATERAL BEAM DRIFT

CROSS REFERENCE TO RELATED APPLICATIONS

The present invention is a continuation-in-part of and claims benefit of presently pending U.S. patent application Ser. No. 10/958,712 filed Oct. 5, 2004 by Todd E. LIZOTTE for COMPENSATOR OPTICS TO IMPROVE THE STABILITY OF BEAM DELIVERY SYSTEMS THAT UTILIZE BEAM SHAPING TECHNOLOGY, which is a continuation-in-part of and claims benefit of U.S. patent application Ser. No. 10/411,570 filed Apr. 10, 2003 now U.S. Pat. No. 6,853,489 by Todd E. Lizotte for CORRECTION OF ANGULAR DEVIATION AND RADIAL DRIFT OF LASER BEAMS and since allowed.

FIELD OF THE INVENTION

The present invention relates to the control and correction of laser pointing and thermal drift instability in laser beam delivery systems and, in particular, to radially non-symmetric beamforming elements for correction of laser beam energy profile distortions due to lateral beam shifts.

BACKGROUND OF THE INVENTION

Focused and directed laser beams are commonly used for a variety of processes, such as drilling of blind, through and micro-vias, laser imaging, dicing of substrates and modification or customization of integrated circuits, drilling, cutting, and selective material removal and other complex machining and micro-machining operations involving materials such as metals, polymers, integrated circuits, substrates, ceramics and other materials. Such processes have become very complex, often involving the concurrent or sequential of use of single or multiple lasers or multiple types of lasers, such as visible, infra-red (IR) and ultraviolet (UV) lasers, in concurrent or sequential operations. In generally all such laser processes, however, the general object of a laser system is to controllably and reliably direct, focus and concentrate the energy of one or more laser beans to converge each beam at a desired spot or to image an apertured area of a laser beam onto the surface of an object.

A number recurring problems of conventional laser systems of the prior art, however, directly affect the reliable and controllable "pointing" of a laser beam to a desired location. The first, which is illustrated in FIGS. 1A and 1B, is often referred to as "beam wobble" or "pointing instability" and is the radial deviation of the Beam Axis 10 a Laser Beam 12 from an Optimum Centerline 14 by a Deviation Angle θ and is often related to variations in the pulse energy of the laser beam, which is often referred to as "pumping jitter". Pointing instability is essentially inherent in both the properties of a Laser 16 itself and in the normal operations of a Laser 16, such as "pumping jitter".

A second problem of the prior art is illustrated in FIGS. 2A and 2B and is often referred to as "thermal drift", which again causes the Beam Axis 10 of a Laser Beam 12 to drift from an Optimum Centerline 14. Thermal drift is generally regarded as due to changes in the parameters of the Laser 16 due to changes in the laser duty cycle, heating during operation, changes in power levels of the Laser 16. It should be noted that, unlike "pointing instability" which results in an angular deviation of the Beam Axis 10 from the Optimum Centerline 14, "thermal drift" results in a linear radial drift of the Beam Axis 10 with respect to the Optimum Centerline 14. That is, the Beam Axis 10 of a Laser Beam 12 remains parallel to the axis of Optimum Centerline 14, but drifts radially away from Optimum Centerline 14.

Yet a third problem of the prior art is that of beam mode changes over time, which results in "hot spots", or distortions of the beam profile. If the profile of the beam is non-uniform or does not have an optimum Gaussian profile, the shape of the profile cannot be subsequently shaped into the preferred "flat top" profile, which will adversely effect the quality of the processes performed by the laser system, such as micro-machining or the drilling of microvias. This problem is further compounded, of course, by pointing instabilities and thermal drift.

Effectively all lasers used for micro-machining, such as microvia drilling, exhibit pointing instability, thermal drift and profile distortion, and there have been many attempts to correct or at least control these problems. For example, laser systems of the prior art have attempted to correct the effects of "pointing instability" and "thermal drift" by the use of actively controlled servo-mirrors, which are controlled to redirect a laser beam so as to correct for the "pointing instability" and "thermal drift". Such methods, however, require detecting and comparing the actual path of a beam due to pointing instability or thermal instability with the desired optimum path for the beam and controlling the servo-mirrors so as to direct the beam into the desired path. Not only are such methods complex and expensive, but they have an inherent time delay in detecting and correcting the effects of pointing instability or thermal drift, and introduce errors of their own due to mechanical and control system tolerances and have thereby not provided completely satisfactory solutions to these problems.

Other approaches of the prior art to these problems have used optical elements in the laser beam path to correct for pointing instabilities and thermal drift and to shape the beam into the optimum Gaussian and flat-top profiles for micro-machining, such as the drilling of microvias. A recurring problem, however, is that when the an optical beam shaping system is illuminated poorly, that is, either at an incident angle or with a laterally displaced beam, such as may result from pointing instabilities, thermal drift or hot spots, the optical beam shaping elements are not able to shape the laser beam into the desired profile.

The basic problems arising with the use of optical elements to correct or compensate for pointing instability and thermal drift are illustrated in FIGS. 3A and 3B with respect to the use of holographic optical elements (HOEs) and standard symmetric holographic optical element (SSHOEs) employed as beam shaping elements. FIG. 3A, for example, illustrates the results of radial displacement due to thermal drift effects in the case of a Holographic Optical Element (HOE) and, in particular, with respect to a Standard Symmetric Holographic Optical Element (SSHOE) 18, or an equivalent lens. Because the SSHOE 18 is symmetric, a Laser Beam 12A that enters the SSHOE 18 along a Beam Axis 10A that is parallel to the HOE Axis 20 will exit the SSHOE 18 as Laser Beam 12B on Beam Axis 10B wherein Beam Axis 10B is coaxial with and a linear continuation of Beam Axis 10B. More specifically, a Laser Beam 12A entering the SSHOE 18 along a Beam Axis 10A that is parallel to but radially displaced by a distance D from the HOE Axis 20 will exit the SSHOE 18 along the same Beam Axis 10A, indicated as Beam Axis 10B, and will remain radially displaced with respect to the HOE Axis 20 by a distance D. As such, a SSHOE 18 or equivalent symmetric lens will not radially redirect the Beam Axis 10 of an entering Laser Beam 12 with respect to the HOE Axis 20 of the SSHOE 18, and thereby cannot correct for or control thermal drift effects.

Referring to FIG. 3B, a Laser Beam 12A effected by "pointing instability" will enter an Entry Face 22 of the SSHOE 18 along Beam Axis 10A having an angular deviation $\theta$ with respect to the HOE Axis 20, that is, will not be parallel with the HOE Axis 20. Because of the symmetry of a SSHOE 18 or equivalent symmetric lens, however, the Laser Beam 12B will exit the Exit Face 24 of the SSHOE 18 along a Beam Axis 10B that is the continuation of the Beam Axis 10A along which the Laser Beam 12A entered the SSHOE 18. As in the case of thermal drift, therefore, conventional SSHOEs 18 and similar symmetric lenses cannot correct for or control pointing instability and the resulting angular deviation of the Beam Axis 10.

Instability and shifting in the input beams to beamshifting elements, however, can frequently lead to yet other problems in typical beam delivery systems, such as a micro-machining system for the drilling of microvias, by distortion of the laser beams generated by the beamshaping optics of the system.

For example, in a typical laser beam delivery system such as illustrated in FIGS. 4A through 4D, the Laser 12 is typically comprised of diode pumped solid state (DPSS) laser or a Diode Pumped Fiber (DPFL) laser, which tend to generate TEM00 single mode laser beams with optimum Gaussian energy profiles. In a typical system such as illustrated in FIGS. 4A through 4D, Beamshaping Optics 26 are used to reshape an Output Beam 12I having an optimum Gaussian Profile 12GP into an Output Beam 12O having a Flat-Top Profile 12FP, that is, a uniform energy profile particularly advantageous for micromachining operations, and are typically comprised of, for example, diffractive or holographic beam diffusers or shaping optics.

As is well known, the Input Beam 12I generated by a Laser 12 will tend to drift laterally by amounts ranging from a few microns to several hundreds of microns with changes in the Laser 12 parameters, such as the pump diode current changes, harmonic crystal shifts, changes in the pulsing frequency or repetition rate, and so on. The typical results of such lateral drifts of the Beam Axis 10 of a Input Beam 12I from an Optimum Centerline 14 that is coaxial with the Optical Centerline 26C of Beamshaping Optics 26 are represented diagrammatically in FIGS. 4A, 4B, 4C and 4D. FIGS. 4A and 4B illustrate the situation wherein the Beam Axis 10 of Input Beam 12I is coaxial with Optical Centerline 26C of Beamshaping Optics 26, with FIG. 4B being a superimposed comparison of the energy profiles of Input Beam 12I and the resulting Output Beam 12O. FIGS. 4C and 4D, in turn, illustrate the situation wherein the Beam Axis 10 of Input Beam 12I is laterally offset with respect to the Optical Centerline 26C of Beamshaping Optics 26, with FIG. 4D again being a superimposed comparison of the energy profiles of the input and output beams.

As illustrated in FIGS. 4A through 4D, each lateral shift of the Input Beam 12I with respect to the axis of Beamshaping Optics 26, however, that is, each shift from the situation of FIGS. 4A and 4B to the situation of FIGS. 4C and 4D, will result in a non-uniform energy profile in Output Beam 12O. In the typical situation as illustrated in FIGS. 4C and 4D, for example, a Lateral Offset 64O of Input Beam 12I will result in the generation of either or both of a "Hotspot" 64S in the energy profile of Output Beam 12O and a deficiency or "Deficiency" 64D in the energy profile of Output Beam 12O. As illustrated, a Hotspot 64S is a region of an energy profile in which the energy level is higher than desired while a Deficiency 64D is a region of an energy profile in which the energy level is lower than desired. In this regard, it should be noted that Hotspots 64S are typically formed on the side of the energy profile in the direction of the Lateral Offset 64O of the Input Beam 12I, with Deficiencies 64D typically appearing in the energy profile in the direction opposite to the Lateral Offset 64O.

Such distortions in the energy profiles of the Output Beam 12O obviously degrade the performance of a laser beam delivery system such as a laser micromaching system. As a result, each such shift of the beam axis requires either a realignment of the beam delivery system in order to restore the desired Flat-Top Profile 12F of Output Beam 12O. The required realignment of the system may be accomplished by either or both of a realignment of Beamshaping Optics 26 to the new location of Beam Axis 10 of Input Beam 12I or a realignment of Beam Axis 10 of Input Beam 12I to the Optical Centerline 26C of Beamshaping Optics 26, either of which represents a significant down time for the system. It will be appreciated that the need to realign the laser beam system optics or the laser beam for each lateral shift of the laser beam, regardless of the cause of the shift, will be a significant problem as an industrial laser system on the production floor will typically, and for example, require realignment several times a day or even several times a work shift.

In this regard, it must also be noted that while non-symmetric optical elements, including compensator and remapping elements, may be employed to address some of the problems arising from unwanted lateral shifts in a laser beam, such non-symmetric elements are typically comprised of holographic or diffractive optical elements. Such optical elements typically have fixed characteristics that, because they are fixed while the possible lateral shifts of a laser beam are not fixed, may not be able to adequately address the full range of possible lateral shifts of a laser beam in a given system.

The present invention provides a solution to these and related problems of the prior art.

SUMMARY OF THE INVENTION

The present invention is directed to a radially non-symmetric beamforming element for transforming the input energy profile of an input laser beam into a desired output energy profile of an output laser beam in systems wherein the beam axis of the input laser beam is subject to lateral shift that is variable in radial direction and magnitude.

The beam forming element of the present invention includes an optical element having a profile transformation function that includes a first profile transformation function for transforming the input energy profile into the desired output energy profile and a profile correction transformation function superimposed on the first profile transformation function for modifying the first profile transformation function to correct distortions in the output energy profile introduced be a lateral shift of the input laser beam.

In a presently preferred embodiment, the profile correction transformation function of the radially non-symmetric beamforming element includes at least one of a deficiency profile transformation function and a hotspot profile transformation function. The deficiency profile transformation function is superimposed on the first profile transformation function for superimposing a compensating deficiency energy profile on the desired output energy profile in a location corresponding to a hotspot resulting from a lateral shift of the input laser beam. The hotspot profile transformation function is likewise superimposed on the first profile transformation function for superimposing a compensating hotspot energy profile on the desired output energy profile in a location corresponding to a deficiency resulting from a lateral shift of the input laser beam.

Further according to the present invention, an optical axis of the beamforming element is aligned parallel to the beam axis of the input laser beam and is offset from an unshifted beam axis of the input laser beam by a distance proportionate to a maximum expected lateral shift of the beam axis of the input laser beam, so that the input laser beam passes through the beamforming element parallel to and offset from the optical axis of the optical element.

In yet further embodiments, the beamforming element is supported in a rotating mount allowing rotation of the profile transformation function about the optical axis of the optical element to allow adjustment of the profile transformation function to a current lateral shift of the input laser beam.

BRIEF DESCRIPTION OF THE DRAWING(S)

The invention will now be described, by way of example, with reference to the accompanying drawings in which:

FIGS. 1A and 1B are illustrative diagrams of angular deviation of a laser beam due to pointing instability;

FIGS. 3A and 3B are illustrative diagrams of radial displacement and angular deviation of laser beams;

FIG. 5 is an illustrative diagram of a method of the present invention for correcting angular deviation or radial displacement;

FIGS. 6A, 6B, 6C, 6D, 6E and 6F are illustrative diagrams of optical elements and combinations of optical elements for correcting angular deviation and radial drift of laser beams;

DETAILED DESCRIPTION OF THE INVENTION

A. Introduction

Figures 2A, 2B:
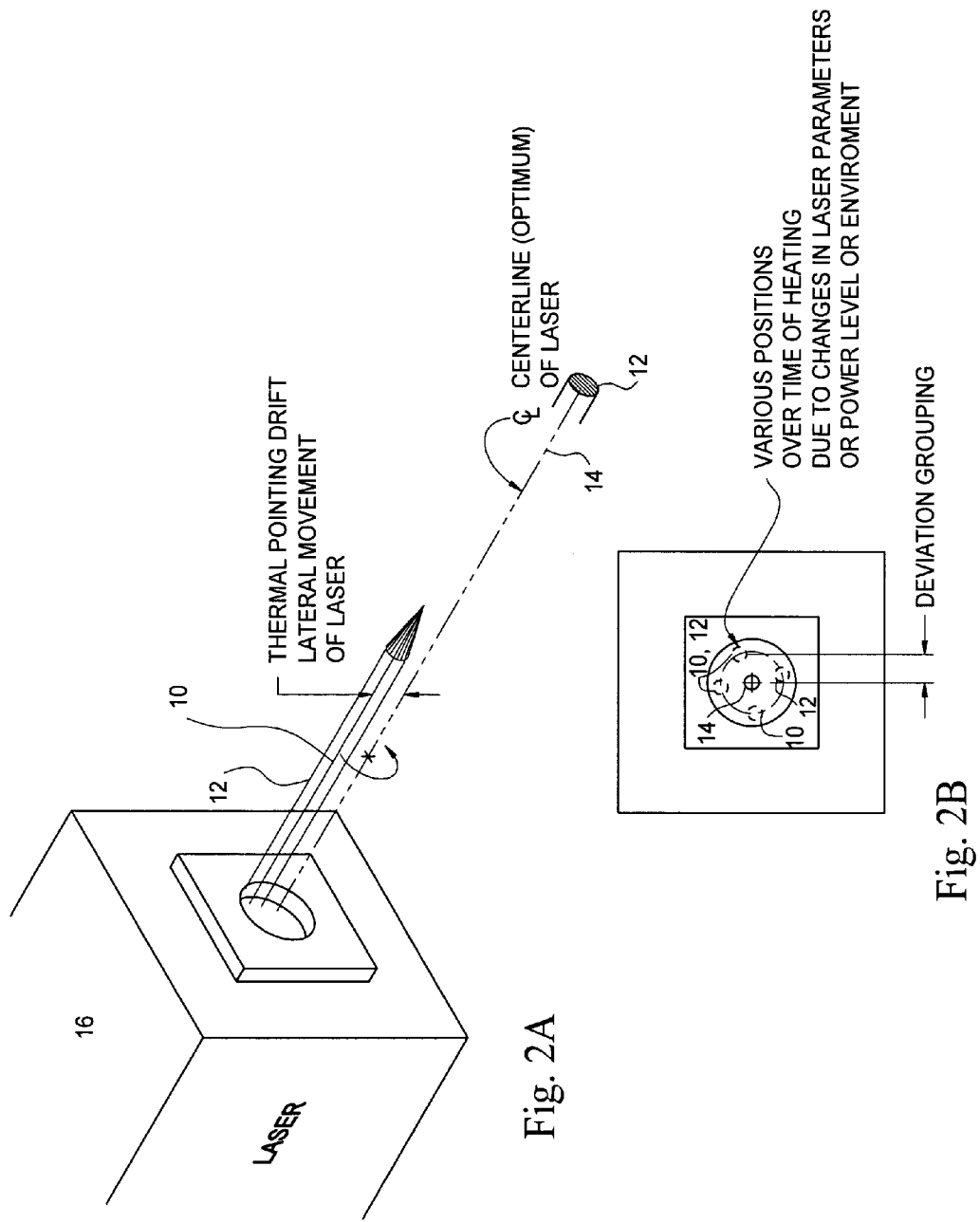
FIGS. 2A and 2B are illustrative diagrams of radial drift of a laser beam due to thermal drift.
Figure 4A:
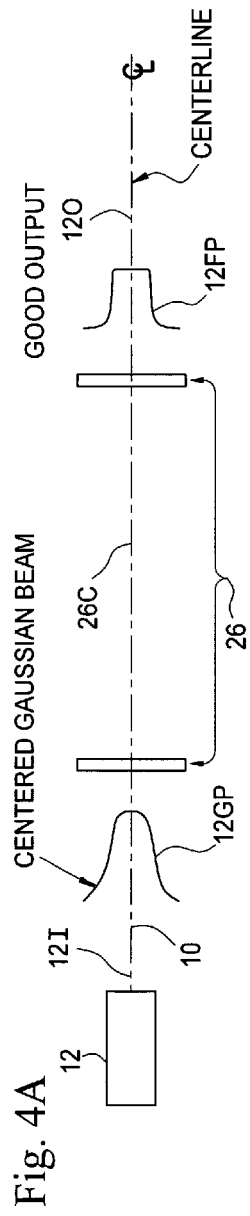
FIGS. 4A and 4C are illustrative diagrams of beamshaping optics for, respectively, an input laser beam aligned with the axis of the beamshaping optics and laterally offset with respect to the axis of the beamshaping optics.
Figure 4B:
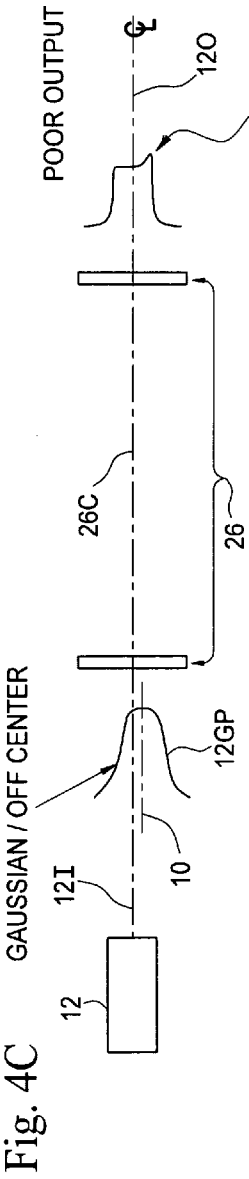
FIGS. 4B and 4D are illustrative superimposed comparisons of the input and Output Beam energy profiles for the situations illustrated in FIGS. 4A and 4C.
Figure 4C:
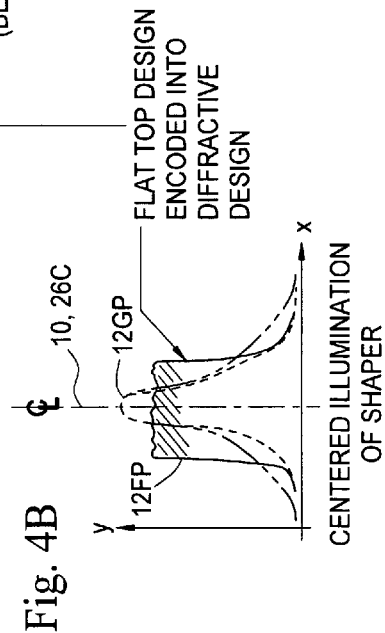
Figure 4D:
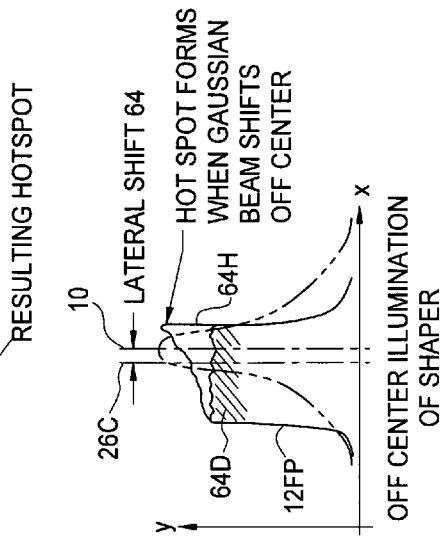

The following will describe methods and apparatus for addressing the above discussed problems of the prior art. In particular, the following will first describe and discuss methods and apparatus for the correction of either or both of radial displacement due to thermal drift and angular deviation due to pointing instability by means of non-symmetric elements.

The following will then describe and discuss certain preferred embodiments of non-symmetric elements for the correction of radial (lateral) displacement and pointing instability in the form of compensator and remapping non-symmetric elements. As will be described, compensator and remapping elements accept an input beam over a range of input angles and lateral (radial) displacements and "remap" the energy profile of the input beam to provide an output beam having an output profile that is optimum for a following element, such as beamshaping elements.

The following will then describe and discuss methods and apparatus for the realignment of a laser beam that has drifted laterally (radially), the elimination of "hotspots" from the energy profile of the output beam of beamshaping elements, and the restoration of a desired energy profile to the output beam of beamshaping elements.

B. Correction of Radial Displacement and Pointing Instability By Non-Symmetric Elements As illustrated generally in FIGS. 6 and 6A through 6F, either or both of radial displacement due to thermal drift and angular deviation due to pointing instability may be corrected by means of a Non-Symmetric Element (NSE) 28 as illustrated in FIG. 6. As illustrated therein, an NSE 28 may be, for example, a Non-Symmetric Hologram Optical Element (NSHOE) or an equivalent optical element, such as a non-symmetric lens or a non-symmetric refraction element or a non-symmetric diffraction element. As indicated, an NSE 28 differs from a SSHOE 18 or equivalent symmetric element in that the path of the Beam Axis 10 of a Laser Beam 12 traversing the NSE 28 is refracted, or turned, through a Correction Angle ϕ during the passage of the Laser Beam 12 through the NSE 28. As will be discussed further in the following, in one embodiment of a NSE 28 the angle ϕ increases with increasing radial displacement Δ of the incident Beam Axis 10 from the Centerline Axis 28C of the NSE 28. In a second embodiment of a NSE 28, the Correction Angle ϕ increases with an decreasing angle of incidence α of the Beam Axis 10 of the incident Laser Beam 12 with respect to the plane surface of the NSE 28.

Examples of embodiments of Drift/Deviation Correction Elements 32 for correcting either or both of radial displacement due to thermal drift and angular deviation due to pointing instability are illustrated in FIGS. 6A, 6B and 6C.

FIG. 6A illustrates an embodiment of a Drift/Deviation Correction Element 32 for the correction of angular deviation of a Laser Beam 12 due to pointing instability. As shown, in this instance the Drift/Deviation Correction Element 32 is comprised of a single NSE 28, 28A, 28B, 28C, 28D or 28S such as a Non-Symmetric Hologram Optical Element (NSHOE) or equivalent non-symmetric lens.

First considering the geometric aspects of angular deviation due to pointing instability as illustrated in FIG. 6A, a Laser Beam 12 having angular deviation resulting from pointing instability may be considered as emitting from a point, that is, from Laser 16, such that the Beam Axis 10 of each Laser Beam 12 radiates outwards from that point at an angular deviation θ that is dependent upon the degree of wobble and until the Laser Beam 12 strikes the plane of the NSE 28. A consideration of the geometry of the elements shown in FIG. 6A will show that the angle of incidence α between the Beam Axis 10 and the plane of the NSE 28A will decrease, in a reciprocal relationship, as the angular deviation θ increases. It will also be apparent that the radial displacement Δ between the Centerline Axis 28C of the NSE 28A and the point at which the Beam Axis 10 is incident upon the NSE 28A increases as the angular deviation θ increases. Stated another way, an angular deviation θ will result in both an inversely proportionate angle of incidence α with the NSE 28A and a proportionate radial displacement Δ from the Centerline Axis 28C of the NSE 28A.

It will be apparent that the correction of angular deviation due to pointing instability, requires that the Beam Axes 10 of the Laser Beams 12 be redirected, that is, turned or refracted, through an Correction Angle φ to orient the Beam Axes 10 in the desired manner. In this regard, and for example, the Correction Angle φ may be designed so that the Beam Axes 10 are parallel to HOE Axis 20 upon exiting the NSE 28A. In other instances, the Correction Angle φ may be designed to direct the Laser Beams 12 onto a selected point or area at a predetermined distance from the NSE 28A, such as at the entry face of a second NSE (not shown).

In either instance, and as may be seen from the above discussion of angular deviation geometry, the magnitude of the Correction Angle φ must therefore increase with either increasing radial displacement Δ or with decreasing angle of incidence α. In a first embodiment of an Angular Correction NSE 28A, therefore, the Angular Correction NSE 28A, which may be, for example, a NSHOE or equivalent non-symmetric lens, is designed such that the Correction Angle φ increases proportionally to the radial distance from the central axis of the Angular Correction NSE 28A. As described, therefore, the greater the angular deviation θ of a Beam Axis 10 the greater the radial displacement Δ of the Beam Axis 10 from the central axis of the Angular Correction NSE 28A and the greater the Correction Angle φ.

In a second embodiment of an Angular Correction NSE 28A, the Angular Correction NSE 28A may be designed such that the Correction Angle φ increases with a decreasing angle of incidence α, that is, with an increasing angular deviation θ of the Beam Axis 10. As may be seen, however, the two embodiments of an Angular Correction NSE 28A are equivalent because the relationship between angular deviation θ, angle of incidence a and radial displacement Δ.

As illustrated in FIG. 6A, therefore, the Angular Correction NSE 28A of the Drift/Deviation Correction Element 32 will correct an angular deviation θ by turning, or refracting, the Laser Beam 12 through a Correction Angle φ that is proportionate to the angular deviation θ. The result will therefore be that any Laser Beam 12 having a Beam Axis 10 that is not parallel to the HOE Axis 20 will be turned through a Correction Angle φ so that the Beam Axis 10 will be parallel to the HOE Axis 20 or so that the Beam Axis 10 is directed to a selected focal point or area.

The result of the operation of an Angular Correction NSE 28A is illustrated in FIG. 6B, which is an end view of a Laser 16 showing a possible distribution of Corrected Beams 12C about the Optimum Centerline 14 in comparison with a possible distribution of the Uncorrected Beams 12U.

FIG. 6C, in turn, illustrates an embodiment of a Drift/Deviation Correction Element 32 for the correction of radial displacement of a Laser Beam 12 due to thermal drift. As discussed previously, thermal drift or similar causes of radial displacement result in a radial displacement of a Beam Axis 10 from a desired Optimum Centerline 14, rather than an angular deviation from the Optimum Centerline 14. For this reason, the radial displacement, that is, thermal drift, results in a Beam Axis 10 having an angle of incidence α of approximately 90° with respect to a NSE 28 and correction of radial displacement Δ will be a function of radial displacement Δ rather than of angle of incidence α.

As shown, in this instance the Drift/Deviation Correction Element 32 may be comprised of a Displacement Correction NSE 28B followed by a Collimating NSE 28C, each of which may be, for example, Non-Symmetric Hologram Optical Elements or equivalent non-symmetric lenses.

In this embodiment, and as discussed above, the Correction Angle φ of Displacement Correction NSE 28B increases radially and proportionately to the radial displacement Δ between Centerline Axis 28C of Displacement Correction NSE 28B and the point at which the Beam Axis 10 of a Laser Beam 12 is incident upon the plane of the Displacement Correction NSE 28B. The effect of Drift Correction NSE 28B is therefore to refract or turn a Laser Beam 12 through a Correction Angle φ that is proportionate to the radial displacement Δ of the Beam Axis 10, that is, by an angle proportionate to the thermal drift of the Laser Beam 12. Because the displacement of Beam Axes 10 of Laser Beams 12 resulting from thermal drift is radial, and the Beam Axis 10 of a Laser Beam 12 is thereby approximately parallel to the Optimum Centerline 14, the Beam Axes 10 are usually perpendicular to the entering face of the Displacement Correction NSE 28B. As such, the Correction Angle φ imposed by the Displacement Correction NSE 28B will compress, that is, direct or focus, the Beam Axes 10 onto a point or small area at a fixed distance from the Displacement Correction NSE 28B. As illustrated in FIG. 6C, the focus point of Displacement Correction NSE 28B is near or at the entry face of the second element of Drift/Deviation Correction Element 32, which is shown as Collimating NSE 28C.

Collimating NSE 28C is, in some respects, analogous to an inverse transform of an Angular Correction NSE 28A. That is, and as indicated, Laser Beams 12 enter Collimating NSE 28C from Correction NSE 28B such that their Beam Axes 10 generally are at an angle a with respect to the HOE Axis 20 of Collimating NSE 28C, that is, at an angle analogous to an angular deviation θ. As illustrated, Collimating NSE 28C redirects or turns each incoming Laser Beam 12 through a Correction Angle φ that is inversely proportionate to the angle of incidence α, so that the Beam Axes of the Laser Beams exiting Collimating NSE 28C are parallel.

A Drift/Deviation Correction Element 32 comprised of a Displacement Correction NSE 28B followed by a Collimating NSE 28C may thereby correct radial displacement due to thermal drift by first redirecting the Laser Beams 12 to reduce the radial displacement of each Laser Beam 12, by focusing or directing the Laser Beams 12 into a defined area at a defined distance, and then by correcting the relative angles of the Beam Axes 10 to be parallel to the desired Optimum Centerline 14.

The operation of such a Drift/Deviation Correction Element 32 is illustrated in FIG. 6D, which illustrates a possible distribution of Corrected Beams 12C about the Optimum Centerline 14 in comparison with Uncorrected Beams 12U.

Next considering the case illustrated in FIG. 6E, it will be apparent that angular deviation due to pointing instability and radial displacement due to thermal drift will rarely occur in isolation and that it will be common for both effects to be present in a given situation. As such, the Beam Axes 12 many if not all Laser Beams 12 will show both angular deviation and radial displacement and the radial distance from the Centerline Axis 28C of the NSE 28D at which a given Laser Beam 12 will impinge upon a NSE 28D may be due to radial displacement, or due to angular deviation or due to both in varying degrees.

As such, a two element Drift/Deviation Correction Element 32 may be constructed using, for example, a Deviation Correction NSE 28A followed by a Displacement Correction NSE 28B. Each would function as described above so that the combination would first correct the angular deviation of the Laser Beams 12, redirecting each Laser Beam 12 through a Correction Angle φ dependent upon the angular deviation to Output Beams 12 having parallel Beam Axes 10. The first stage would therefore, and in effect, change angular deviation into radial displacement, and radial displacement into angular displacement, so that the Output Beams 12 would demonstrate only radial displacement. The second stage would then correct radial displacement, as discussed with regard to FIG. 6C, to provide the final Output Beams 12.

Another embodiment of a Drift/Deviation Correction Element 32 is illustrated in FIG. 6E wherein the characteristics of both an Angular Correction NSE 28A and a Displacement Correction NSE 28B are combined in a single Angular/Displacement Correction NSE 28D, which may be comprised, for example, of a NSHOE. In this instance, the Correction Angle φ is a function of both the radial displacement of an impinging Laser Beam 12 from the HOE Axis 20 and the angle of incidence α of a Laser Beam 12 on the Angular/Displacement Correction NSE 28D, so that the single Angular/Displacement Correction NSE 28D performs the function of both an Angular Correction NSE 28A and a Displacement Correction NSE 28B.

In either embodiment, the output of the Drift/Deviation Correction Element 32 is passed through a Collimating NSE 28C to form a collimated Laser Beam 12, and then through a Shaper Element 28S. It will be understood, in this regard, that Collimating NSE 28C and Shaper Element 28S may be arranged in any order, and that these elements may be comprised of, for example, NSHOEs, HOEs, aspheric optical elements, or any other elements that will perform the required functions.

The results of the embodiment illustrated in FIG. 6E are illustrated in FIG. 6F for a possible distribution of Corrected Beams 12C about an Optimum Centerline 14 in comparison with Drift Uncorrected Beams 12DU and Angular Uncorrected Beams 12AU.

C. Compensator and Remapper NSEs

Having described the general method and apparatus of the present invention for correcting or compensating for the angular deviation and radial drift of laser beams, the following will next describe certain presently preferred embodiments of the general principles and apparatus described above.

Figure 7A:
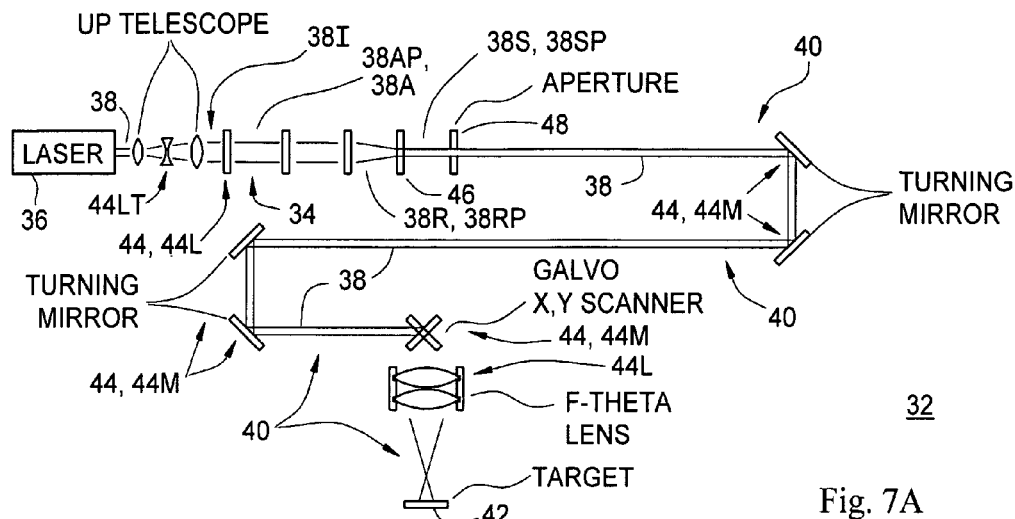
FIGS. 7A, 7B and 7C are illustrative diagrams of systems in which the present invention is implemented.
Figure 7B:
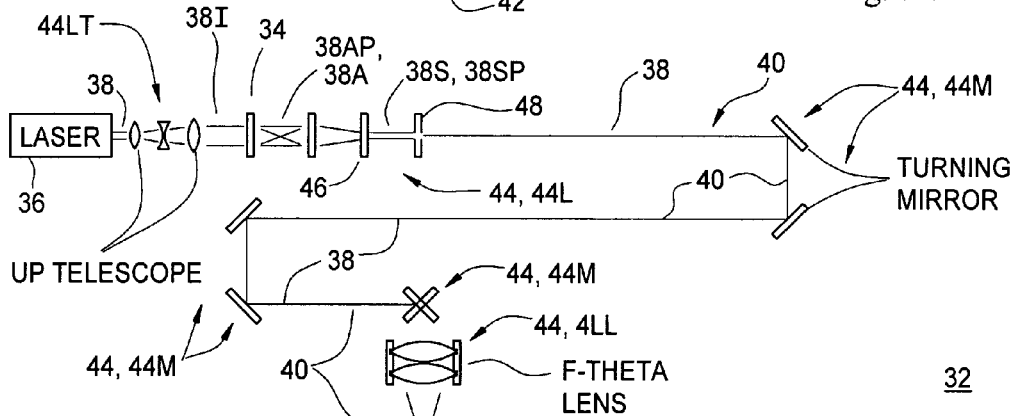
Figure 7C:
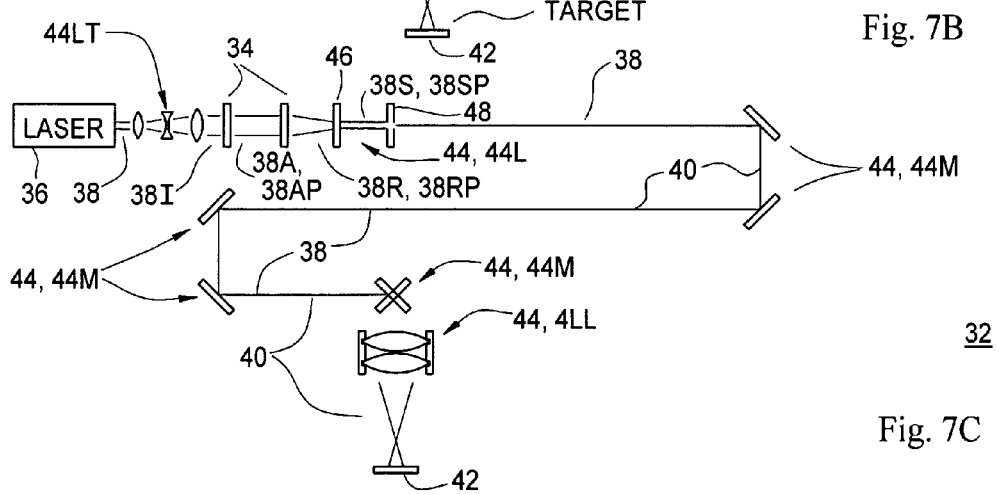

Referring to FIGS. 7A, 7B and 7C, therein are illustrated embodiments of exemplary Systems 34A, 34B and 34C, hereafter referred to generally as a System or Systems 34, that each include a Compensator/Remapper 36 of the present invention. As will be described, a Compensator/Remapper 36 accepts an input beam over a range of input angles and lateral displacements and "remaps" the input profile of the input beam to provide an output beam having an output profile that is optimum for a following element which shapes the input beam from Compensator/Remapper 36 into a final output beam.

As illustrated in FIGS. 7A, 7B and 7C, a System 32 includes a Laser 38 generating a laser beam, identified generally as Beam 40, that is transmitted along a Beam Path 42 to one or more Targets 44. It should be noted that in certain systems the Beam 38 may be divided into a group of beamlets that may be steerable individually or as a group and that for purposes of the present descriptions will be collectively referred to as Beam 38. As shown, Beam Path 40 typically includes a number of Optical Elements 46, such as Lenses 46L and Mirrors 46M, that form, focus and shape Beam 38 along Beam Path 40.

The Optical Elements 46 of typical Laser System 32 may include, for example, an Up Telescope Assembly 46LT, which is an assembly of multiple Lenses 46L to initially shape and focus the Beam 38 emitted by Laser 36. Up Telescope Assembly 46LT may be followed by a Compensator/Remapper 34 which, as described in further detail below, may be comprised of one or more elements to remap an Input Beam 38I into the Compensator/Remapper 34 into an Remapped Beam 38R having a Remapped Profile 38RP that is selected as optimum for a following Shaper 48 to remap into a final Shaped Beam 38S having a Shaped Profile 38SP. In a presently preferred embodiment in a System 32 for drilling microvias, for example, Remapped Profile 38RP may be a round Gaussian profile and Shaped Profile 38SP will typically be a "flat top" profile, that is, a profile having a generally even energy distribution across the diameter of the Beam 38. A following Aperture 50 then further shapes the Beam 38S and, in particular, shapes the cross sectional image of the Beam 38S.

Lastly, and as also shown, Beam Path 38 further includes fixed Mirrors 42M and galvanometer controlled movable Mirrors 42M for redirecting and steering Beam 30 or Beamlets 30B, and will typically include a final Lens 42L such as a F-Theta lens for final shaping and focus of the Beam 30 or Beamlets 30B.

D. Compensator/Remapper 34

As described, and according to the present invention, Beam Path 40 includes a Compensator/Remapper 34 which accepts an Input Beam 38I having an Input Profile 38IP and "remaps" the profile of Input Beam 38I to provide an Remapped Beam 38R having an Remapped Profile 38RP that is optimum for a following Shaper 46 to remap into a final profile. In a presently preferred embodiment of the invention, a Compensator/Remapper 34 includes a Compensator 34C element that accepts Input Beam 38I, which will typically have a beam or beam components having a range of input angles and lateral displacements, and generates an Aligned Beam 38A output having beam components that are essentially evenly distributed and parallel and that has, for example, a non-round profile so as to evenly illuminate a following Remapper 34R element. Remapper 34R then remaps the output Aligned Beam 30A into the Remapped Beam 38R having an optimum Remapped Profile 38RP, such as a round Gaussian profile, that may then be remapped by Shaper 46 into a Shaped Beam 38S having, for example, a flat top profile.

E. Compensator 34C

In a presently preferred embodiment of a Compensator/Remapper 34, the Compensator 34C element is a computer generated hologram element, or "CGH", that can be illuminated by an Input Beam 38I at different input angles and with different lateral displacements, and will form that Input Beam 30I into an evenly distributed, parallel Aligned Beam 38A with which to illuminate Remapper 34R. In a present embodiment, for example, Input Beam 38I to Compensator 34C may have essentially any profile and Aligned Profile 38AP may be, for example, a non-round profile.

In a presently preferred embodiment of the invention, Compensator 34C is implemented as a hologrammic lens that is encoded over its entire surface. The encoded surface of Compensator 34C or any part thereof thereby includes all of the information necessary to remap Input Beam 38I into an Aligned Beam 38A and Compensator 34C will do so regardless of where on its surface Compensator 34C is illuminated by the Input Beam 38I. It should be noted, however, that a Compensator 34C may also be implemented in other forms, as will be discussed in the following.

Considering the implementation and operation of a Compensator 34C in further detail, discussed and illustrated above with reference to FIGS. 6A–6F, either or both of a radial displacement due to thermal drift and angular deviation due to pointing instability may be corrected by means of a Compensator 34C that embodies and implements a Non-Symmetric Element (NSE) 28. As described, an NSE 28 may be, for example, a Non-Symmetric Hologram Optical Element (NSHOE), that is, a type of CGH element, or an equivalent optical element such as a non-symmetric lens or a non-symmetric refraction element or a non-symmetric diffraction element. As discussed, an NSE 28 differs from a SSHOE 18 or equivalent symmetric element in that the path of the Beam Axis 10 of a Laser Beam 12 traversing the NSE 28 is refracted, or turned, through a Correction Angle $\phi$ during the passage of the Laser Beam 12 through the NSE 28. For example, and as discussed above, in one embodiment of an NSE 28, the angle $\phi$ increases with increasing radial displacement $\Delta$ of the incident Beam Axis 10 from the Centerline Axis 28C of the NSE 28. In another embodiment of a NSE 28, the Correction Angle $\phi$ increases with an decreasing angle of incidence $\alpha$ of the Beam Axis 10 of the incident Laser Beam 12 with respect to the plane surface of the NSE 28.

Referring now to FIGS. 8A, 8B, 8C and 8D, therein are illustrated presently preferred alternate embodiments of a Compensator 34C element or elements for performing lateral drift and angular error correction and compensation. As will be understood by those of ordinary skills in the arts, a Compensator 34C element or elements may be implemented using the using the principles, structures and elements described herein above with respect to various forms of single and multiple NSEs 28. A Compensator 34C element or elements may be embodied as, for example, multi-function diffractive optical elements (MFDOEs), integrated multi-function diffractive optical elements (IMFDOEs), multi-function holographic optical elements (MFCGH) or multi-function fresnel prisms (MFFZPs) or other CGHs or optical assemblies capable of the desired functions.

Figure 8A:
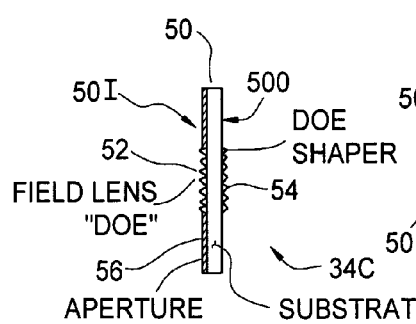
FIGS. 8A, 8B, 8D and 8E are illustrative diagrams of exemplary compensators and remappers.

For example, the Compensator 34C illustrated in FIG. 8A is comprised of a Substrate 52 bearing a Field Lens 54 on Input Side 50I and a DOE Shaper 56 element on Output Side 50O wherein Field Lens 52 and DOE Shaper 56 are comprised of holographic elements and wherein Field Lens 52 also defines an Aperture 58. Field Lens 52 and DOE Shaper 54 are typically CGH elements that are designed, as discussed above, to perform the lateral drift and angular error correction and compensation functions while Aperture 58 shapes the beam passing through the Compensator 34C and masks out portions of the Input Beam 30I that are outside the ranges of Field Lens 52 and DOE Shaper 54.

Figure 8B:
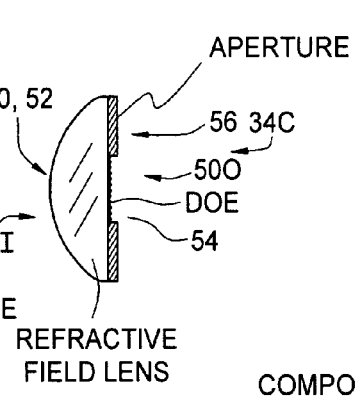

FIG. 8B, in turn, illustrates a Compensator 34C that includes an Aperture 58 but wherein DOE Shaper 54 is implemented as a CGH element on the output face of a refractive lens element forming Field Lens 52. As shown, this embodiment does not require a separate Substrate 50 as the refractive lens forming Field Lens 52 performs this function.

Figure 8C:
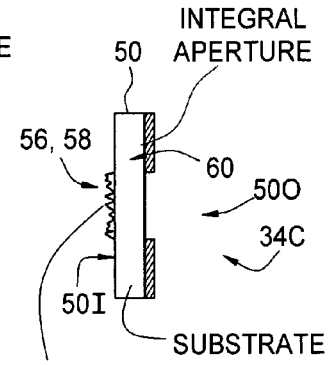

FIG. 8C illustrates an embodiment of a Compensator 34C employing a Substrate 50 and wherein Field Lens 52 and Shaper 54 are integrated into a single compound, or complex, holographic DOE lens element mounted on Input Side 52I of Substrate 54. This embodiment also includes an Aperture 58, which is formed on the Output Side 54O of Substrate 54.

Figure 8D:
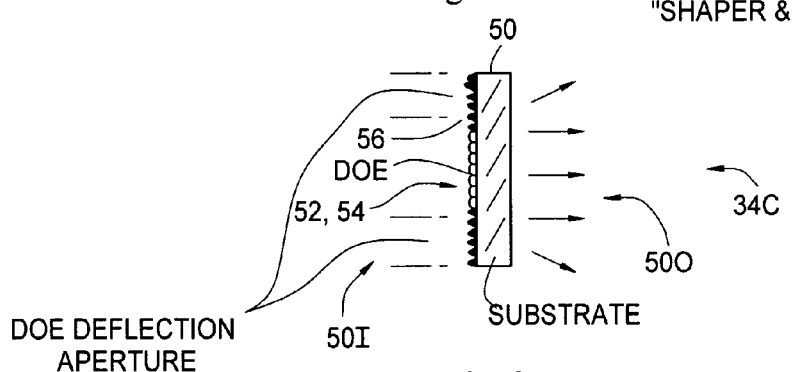
Figure 8E:
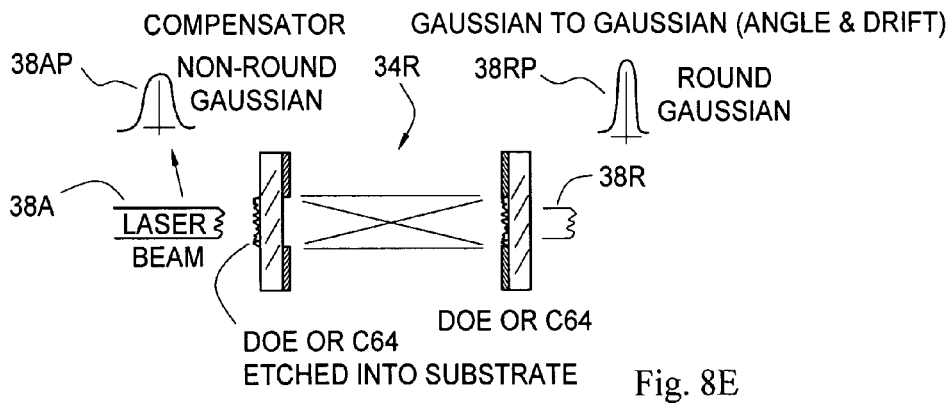

Finally, FIG. 8D illustrates an embodiment of a Compensator 34C wherein Field Lens 52 and Shaper 54 are again integrated into a single compound, or complex, holographic DOE lens element mounted on Input Side 50I of Substrate 50. In this instance, however, Aperture 58 is formed by a DOE deflection aperture surrounding the Field Lens 52/Shaper 54 element on Input Side 50I. As will be understood by those of skill in the arts, a deflection aperture is functionally an aperture, but operates to deflect away those portions of Input Beam 30I that are outside the range of the Field Lens 58/Shaper 60 element.

F. Remapper 34R

Referring now to FIG. 8F, therein is illustrated an embodiment of a Remapper 30R as may be used in a Compensator/Shaper 34 in conjunction with a Compensator 34C.

As described above, Compensator 34C is illuminated by an Input Beam 38I wherein the components of Input Beam 38I may have different input angles and different lateral displacements, and will form that Input Beam 38I into an evenly distributed, parallel Aligned Beam 38A with which to illuminate Remapper 34R. Aligned Beam 38A may, for example, have a non-round Gaussian profile and Remapper 34R remaps Aligned Beam 38A into an Remapped Beam 38R having an optimum profile, designated as Profile 38RP, which may be, for example, a round Gaussian profile. Remapped Beam 38R is then remapped by Shaper 46 into a Shaped Beam 38S having a Shaped Profile 38SP, such as a flat top profile.

In a presently preferred embodiment, Remapper 34R is a CGH implemented as either a radial symmetric diffractive optical element (RSDOE) or a non-symmetric diffractive optical element (NSDOE) that accepts the evenly distributed, parallel Aligned Beam 38A from Compensator 34C and collimates, converges and remaps the profile of Aligned Beam 38A, which may be a non-round Gaussian profile, to form an Remapped Beam 38R having the desired profile for Shaper 46, such as a round Gaussian profile.

While it will be understood from the above discussions that a Compensator/Remapper 34 of the present invention may be constructed from a number of elements arranged in a number of ways, certain of which have been described above, the presently preferred configuration of a Compensator/Remapper 34 is a two element design having a DOE element following a CGH element. In this two element configuration, the separation between the optics of the two elements is on the order of 50 mm to 1500 mm with an optimum distance in the range of 50 mm and the optimum clear aperture of the Compensator/Remapper 34 is in the order of 04. Mm to 25 mm.

Lastly, the above described optical elements of the present invention are commercially available and may be obtained from or manufactured by, for example, MEMS Optical of Huntsville, Ala., Heptagon of Finland, Suss Micro Optics of Neuchatel, Switzerland, or Digital Optics Corporation of Charlotte, N.C.

G. Beamshaping by Radially Non-symmetric Diffractive and Holographic Beamforming Optical Elements to Correct Lateral Shift Distortion It has been described herein above that beamshaping optics are commonly used, for example, to reshape an Input Beam 12I having an optimum Gaussian Profile 12GP into an Output Beam 12O having a Flat-Top Profile 12FP. It has also been described, however, that the for various reasons the laser beam inputs to beamshaping optics may be subject to lateral shifts, that is, radial shifts relative to the optical centerline of the beamshaping optics. As discussed, such lateral shifts in an input beam can result in the generation of undesired "hotspots" or "deficiencies" in the energy profile of the Output Beam 12O.

As also discussed herein above, non-symmetric optical elements may be employed to correct radial displacement of a laser beam due to thermal drift and angular deviation of a laser beam due to pointing instability. Compensator and remapping elements may also be employed to "remap" the energy profile of an input beam to provide an output beam having an output profile that is optimum for a following element, such as beamshaping elements. While these methods may be employed to address the problems arising from lateral shifts of laser beams into beamshaping optics by redirecting or reshaping the laser beam as necessary, it will be appreciated that these methods may not be applicable or desirable in all instances. For example, the use of additional optical elements may increase the cost or complexity or both of a system to unacceptable or uneconomic levels, or may reduce the energy transfer efficiency of the system unacceptably.

Also, such non-symmetric optical elements, including compensator and remapping elements, are typically comprised of holographic or diffractive optical elements and, as such, typically have fixed characteristics. The lateral shifts of a laser beam, however, are not fixed but may vary over a relative wide range of directions and amounts, so that holographic and diffractive optical elements may not be able to adequately address the full range of possible lateral shifts of a laser beam in a given system.

According to this aspect of the present invention, therefore, the problems arising from lateral shifts of the input beams to beamforming optical elements should preferably, and in many instances, be resolved without the need for additional optical elements. In addition, the solution to these problems should preferably be provided by fixed optical elements, such as holographic or diffractive optical elements having fixed characteristics, and fixed optical elements are less expensive and less complex than variable elements. The solution should, however, allow ready adjustment or adaptation of the fixed optical elements to the actual lateral shifts of the input laser beam wherein the actual lateral shifts may occur over relatively wide ranges in both direction and amount.

Figures 9A, 9B:
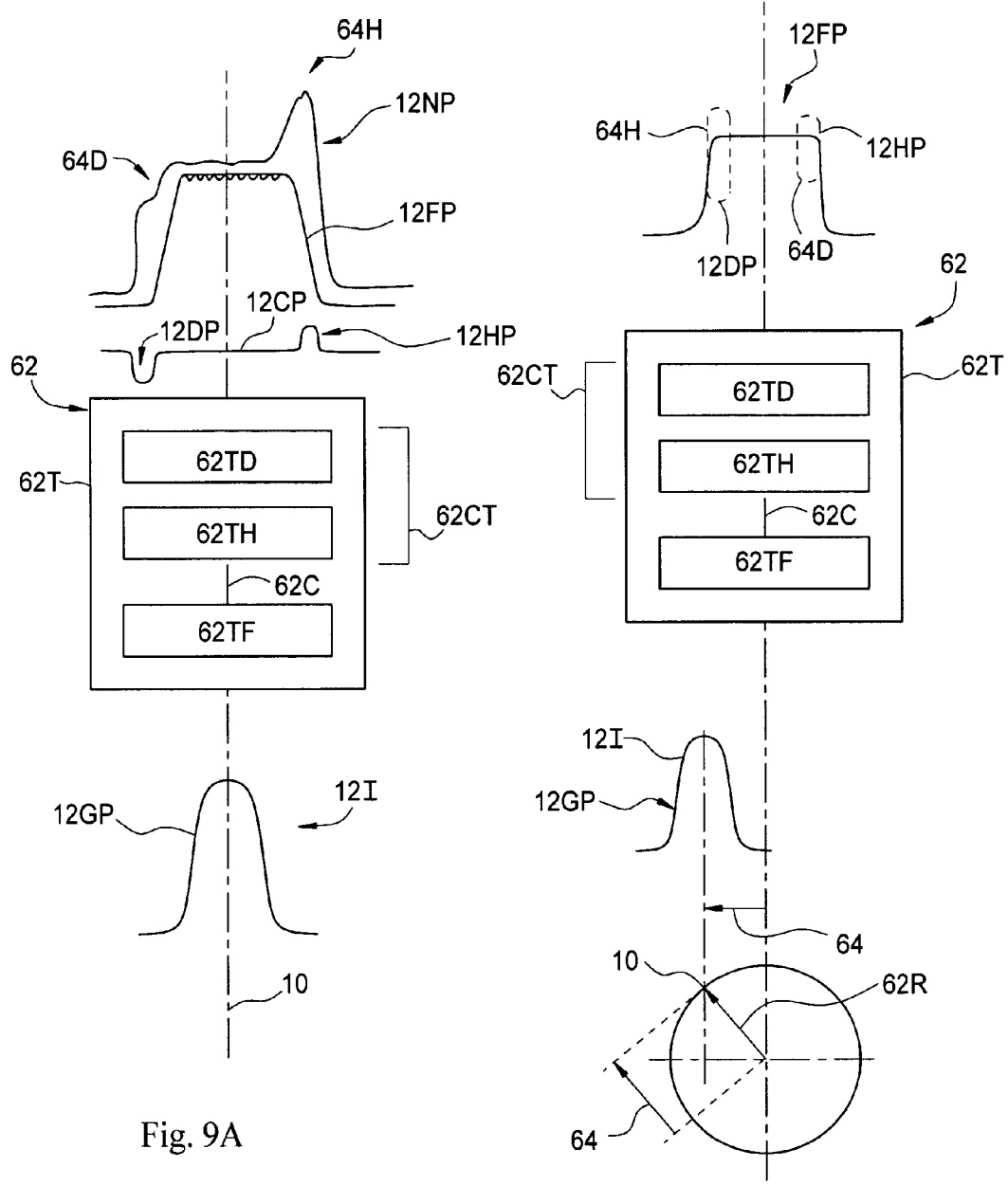
FIGS. 9A and 9B illustrate the operation of a non-symmetric beamforming optical element.

FIGS. 9A and 9B illustrate a Non-Symmetric Beamforming Optical Element 62 having a Beamforming Transform Function 62T for reshaping an Input Beam 12I having a Gaussian Profile 12GP into an Output Beam 12O having a Flat-Top Profile 12FP when Beam Axis 10 of Input Beam 12I has a Lateral Shift 64 relative to the optical axis of Beamshaping Optical Element 62.

As illustrated diagrammatically in FIGS. 9A and 9B, the energy profile transform function implemented in Non-Symmetric Beamforming Optical Element 62 as Beamforming Transform Function 62T is designed to transform an input Gaussian Profile 12GP into a Non-Symmetric Profile 12NP. As will be described below, Non-Symmetric Profile 12NP and the corresponding Beamforming Transform Function 62T are designed to compensate for the expected range of beamforming distortions introduced by lateral shifts of the input beam. In this regard, and in regard to the following descriptions, it must be emphasized that Beamforming Transform Function 62T is determined by and is a function of the Gaussian Profile 12GP of Input Beam 12I, the expected range of lateral offsets of Input Beam 12I, and the Non-Symmetric Profile 12NP necessary to result in the desired Flat-Top Profile 12FP for Output Beam 12O.

The transformation function performed by Beamforming Transform Function 62T may be illustrated by reference to FIGS. 9A and 9B and by considering the Non-Symmetric Profile 12N resulting from illumination of Beamforming Transform Function 62T by an Input Beam 12I having a Gaussian Profile 12GP and Beam Axis 10 centered on the Optical Centerline 62C of Non-Symmetric Beamforming Optical Element 62. A Beamforming Transform Function 62T generating an Output Beam 12O having a Non-Symmetric Profile 12NP from the Input Beam 12I is designed such that the Non-Symmetric Profile 12NP contains features compensating for the distortions caused by lateral offsets of the Input Beam 12I with respect to the Non-Symmetric Beamforming Optical Element 62.

In an exemplary case as illustrated in FIGS. 9A and 9B, the Non-Symmetric Profile 12NP is effectively comprised of a Flat-Top Profile 12FP with a superimposed Compensation Profile 12CP wherein the specific form of Compensation Profile 12CP will depend upon the specific distortion introduced to the profile of Output Beam 12O by drift of Input Beam 12I. In a typical example, and for example, a Compensation Profile 12CP may include either or both of a superimposed Non-Symmetric Hotspot Profile 62HP and a superimposed Non-Symmetric Deficiency Profile 62DP, depending upon the anticipated distortions that may be introduced by a lateral shift of the input beam.

Considering each of the components of the exemplary Compensating Profile 12CP individually, a Non-Symmetric Deficiency Profile 62DP is designed to compensate for or to cancel out, to at least a significant degree, a Hotspot 64H generated in the energy profile of the Output Beam 12O because an offset of the Input Beam 12I. As illustrated, a Non-Symmetric Deficiency Profile 12DP is typically offset from the Optical Centerline 62C of Beamforming Optical Element 62 along a Transform Radius 62R and towards the outer circumferential edge of the Flat-Top Profile 12FP component of Non-Symmetric Flat-Top Profile 12NP so as to generally be superimposed on a potential Hotspot 64H. A Non-Symmetric Deficiency Profile 12DP typically does not extend around the complete circumference of Non-Symmetric Flat-Top Profile 12NP, but only a portion thereof that is expected to contain a Hotspot 64H. It should also be noted that Transform Radius 62R typically extends in the radial, or lateral, direction in which the Beam Axis 10 of Input Beam 12I is shifted with respect to Optical Centerline 62C of Non-Symmetric Beamforming Optical Element 62 as this is the direction in which a Hotspot 64H will typically occur.

A Non-Symmetric Hotspot Profile 62HP, in turn, is intended to compensate for or cancel out, to at least a significant degree, a Deficiency 64D generated in the energy profile of the Output Beam 12O due to an offset of the Input Beam 12I. A Non-Symmetric Hotspot Profile 62HP is typically offset from the Optical Centerline 62C of Non-Symmetric Beamforming Optical Element 62 along a Transform Radius 62R and towards the outer circumferential edge of the Flat-Top Profile 12FP component of Non-Symmetric Flat-Top Profile 12NP. A Non-Symmetric Hotspot Profile 62HP again typically does not extend around the complete circumference of Non-Symmetric Flat-Top Profile 12NP, but only a portion thereof that is expect to contain a Deficiency 64D. It should be noted, however, that in this case the Transform Radius 62R typically extends in the radial, or lateral, direction opposite to that in which the Beam Axis 10 of Input Beam 12I is shifted with respect to Optical Centerline 62C of Non-Symmetric Beamforming Optical Element 62, that is, in the generally opposite direction to a Non-Symmetric Deficiency Profile 62DP, as this is the direction in which a Deficiency 64D will typically occur.

Briefly considering Beamforming Transform Function 62T, as described above a Beamforming Transform Function 62T is defined according to the energy profile of the Input Beam 12I, the energy profile of the Output Beam 12O and the Compensating Profile 12CP required to compensate for or to correct the distortions expected to arise from the anticipated lateral shifts of Input Beam 12I. In the present example, therefore, and in correspondence with the Non-Symmetric Profile 12NP, the Beamforming Transform Function 62T would be comprised of a Flat-Top Transform Function 62TF with a superimposed Compensation Transform Function 62CT comprised, in turn, of either or both of a Hotspot Transform Function 62TH and a Deficiency Transform Function 62TD.

The operation of a Non-Symmetric Beamforming Optical Element 62 may be illustrated by consideration of the energy profiles of the Output Beams 12O generated when the Non-Symmetric Beamforming Element 62 is illuminated by Input Beams 12I having Beam Axes 10 that are and are not offset with respect to the Optical Centerline 62C of Non-Symmetric Beamforming Optical Element 62. When Input Beam 12I is not offset with respect to the Non-Symmetric Beamforming Optical Element 62, the resulting Output Beam 12O will accordingly have a Non-Symmetric Profile 12NP comprised of a Flat-Top Profile 12FP with either or both of a superimposed Non-Symmetric Hotspot Profile 12HP and a Non-Symmetric Deficiency Profile 12HD, depending upon the specific Beamforming Transform Function 62T. It must be noted, however, that if the Input Beam 12I is not laterally shifted there may be no distortion of the energy profile, so that the Beamforming Transform Function 62T may introduce distortions in the Output Beam 12O energy profile in attempting to correct distortions that are not present. This consideration will be discussed further in the following, however.

When Beamforming Optical Element 62 is illuminated by an Input Beam 12I shifted from Optical Centerline 62C of Beamforming Optical Element 62, however, the resulting Output Beam 12O will have a Flat-Top Profile 12F. This result occurs because the Compensation Transform Function 62CT component of Beamforming Transform Function 62T introduces distortions, such as Hotspots 64H and Deficiencies 64D, in the energy profile of Output Beam 12O to compensate for or cancel distortions arising from the lateral shift of the Input Beam 12I.

Next considering further aspects of the present invention, it has been described herein above that a Lateral Shift 64 of the Beam Axis 10 of an Input Beam 12I may vary widely in direction and magnitude relative to the unshifted path of the beam through the system, that is, relative to Optical Centerline 64C of the Non-Symmetric Beamforming Optical Element 62. Beamforming Transform Function 62T is non-symmetric, however, so that the effect of Beamforming Transform Function 62T on the energy waveform of the input and output beams will thereby dependent upon both the radial direction as well as the magnitude of a Lateral Shift 64 relative to Beamforming Transform Function 62T.

Stated another way, it has been described that the circumferential locations of hotspots and deficiencies in an output beam energy profile are dependent upon the radial direction of the lateral shift of the input beam. As such, the locations of the hotspots and deficiencies in the output beam energy profile will appear to rotate about the axis of the output beam proportional to the radial direction of the lateral shift. Beamforming Transform Function 62T is non-symmetric, so that if the rotational position of the Beamforming Transform Function 62T is fixed variations in the radial direction of the lateral shifts will appear as rotational shifts or offsets of the resulting hotspots or deficiencies with respect to the rotational orientation of the Beamforming Transform Function 62T. A rotational mismatch between the Beamforming Transform Function 62T and the lateral shift may thereby result in non-correction of the hotspots and deficiencies by the Beamforming Transform Function 62T, and even the introduction of further hotspots or deficiencies introduced by the Beamforming Transform Function 62T.

In addition, and a discussed, when Input Beam 12I is aligned with the axis of Non-Symmetric Beamforming Optical Element 62, that is, when there is no lateral shift of the input beam, the Beamforming Transform Function 62T may in fact introduce the distortions that it is intended to eliminate by introducing hotspots or deficiencies to correct deficiencies or hotspots that are not actually present due to the lack of a lateral shift.

Non-Symmetric Beamforming Optical Element 62 must therefore be designed to accommodate variations in the direction and magnitude of lateral shifts of the input beam and to avoid alignments of the input beam with the Non-Symmetric Beamforming Optical Element 62 that would introduce rather than correct distortions in the output beam.

In addition, a Non-Symmetric Beamforming Optical Element 62 is preferably constructed of fixed optical elements, such as diffractive or holographic beam diffusers or shaping optics, to reduce complexity and costs. As a consequence, however, a given Non-Symmetric Beamforming Optical Element 62 may provide a compensating effect over only a relatively small range of lateral shift magnitudes and angles.

Figure 9C:
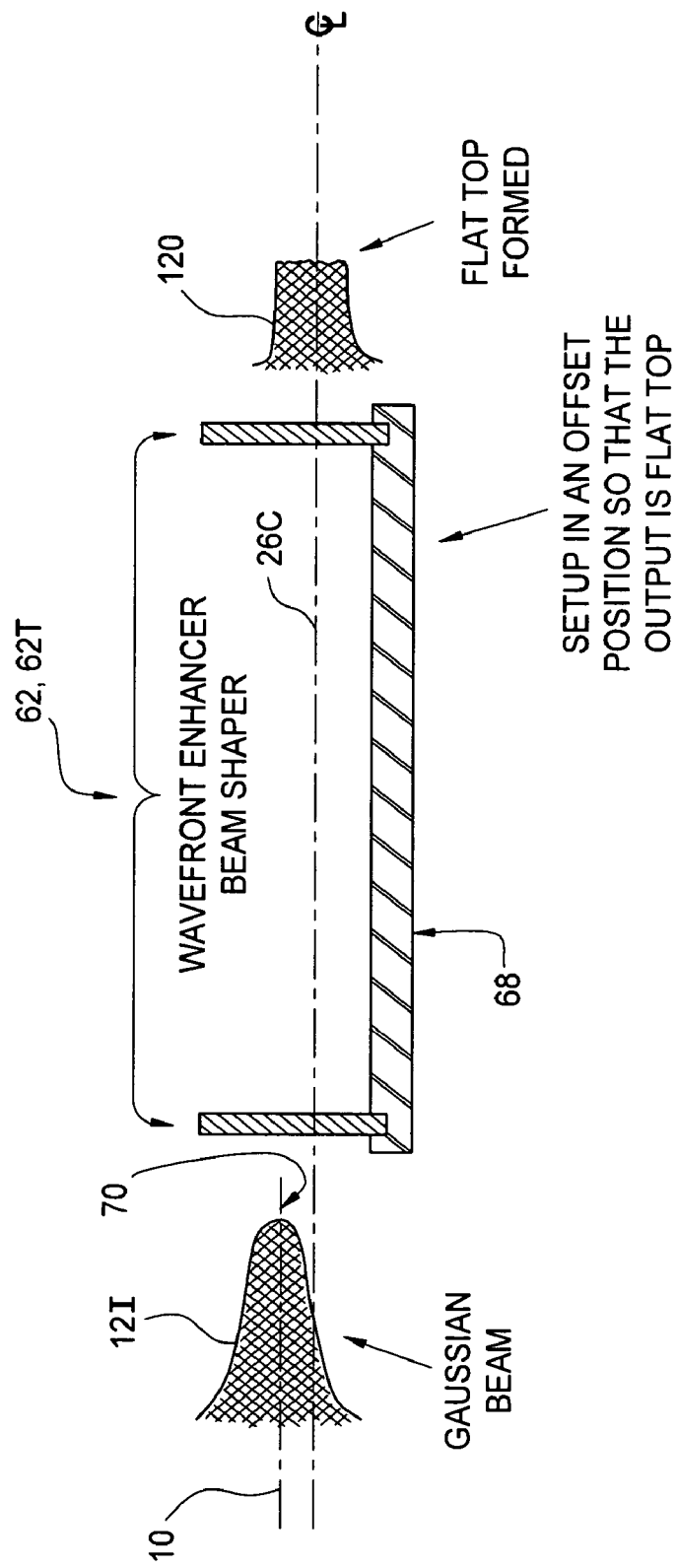
FIG. 9C illustrates a non-symmetric beamforming optical element mounted in an offset mount.

These problems may be addressed by the design of a Non-Symmetric Beamforming Optical Element 62, however. For example, and first considering variations in the magnitudes of the lateral shifts, including the condition where there is no lateral shift, in a presently preferred embodiment the Non-Symmetric Beamforming Optical Element 62 is supported by an Offset Mount 68. As illustrated in FIG. 9C, the Offset Mount 68 supports the Non-Symmetric Beamforming Optical Element 62 so that Optical Centerline 64C of the Non-Symmetric Beamforming Optical Element 62, that is, of the Beamforming Transform Function 62T, is parallel to the nominal Beam Axis 10, but offset with respect to the nominal Beam Axis by an Offset 70. Offset 70, in turn, is selected to be approximately equal to or slightly greater than the expected maximum Lateral Shift 64 of Input Beam 12I, so that Beam Axis 10 will not coincide with Optical Centerline 64C even under a maximum Lateral Shift 64 towards Optical Centerline 64C.

In addition, the Beamforming Transform Function 62T is preferably designed with a "width" or "diameter" adequate to accommodate the expected directions and maximum expected magnitudes of Lateral Shift 64. Stated another way, the Beamforming Transform Function 62T is designed with a radius equal to or slightly greater than the maximum expected Lateral Shift 64 to thereby provide the width necessary to accommodate the maximum expected Lateral Shift 64.

Given the offset of Beamforming Transform Function 62T by Offset Mount 68, therefore, Input Beam 12I will always pass through the Beamforming Transform Function 62T between Optical Centerline 64C and the outer diameter of the Beamforming Transform Function 62T, thereby assuring that the Input Beam 12I will pass through the Beamforming Transform Function 62T even under the maximum magnitude Lateral Shift 64 and regardless of the direction of the Lateral Shift 64. In addition, and because the Offset 70 is greater than the maximum Lateral Shift 64 of the Input Beam 12I, the Input Beam 12I will never coincide with Optical Centerline 64C, thereby avoiding the introduction of unwanted distortions by the Beamforming Transform Function 62T due to the lack of distortions to correct.

Lastly in this regard, it should be noted that the distorting effects of a Lateral Shift 64 of the Input Beam 12I will typically increase with the magnitude of the Lateral Shift 64. In compensation, however, the effects of the component elements of the Compensating Transform Function 62CT, such as either or both of a Hotspot Transform Function 62TH and a Deficiency Transform Function 62TD, may be designed to likewise increase with increasing Lateral Offsets 64 so that the correcting effects of the Compensating Transform Function 62CT track the magnitude of the lateral offset.

As a consequence of the above described aspects of the present invention, the effects of variations in the magnitude of the offset of the input beam relative to the axis of the Beamforming Transform Function 62T will thereby tend to be self compensating. That is, a decrease or increase in the magnitude of the offset will move the input beam radially inward or outward along either or both of the Hotspot Transform Function 62TH and the Deficiency Transform Function 62TD, thereby resulting in a decreased or increased offset compensation effect. As such, and so long as the Beamforming Transform Function 62T can accommodate the greatest expected offset magnitude, a satisfactory adaptation to the magnitude of the offset can often be achieved without further complexity. It should be noted, however, that it is generally preferable that the Beamforming Transform Function 62T not be designed to accommodate an excessively large offset as this may reduce the "fit" between the transform function and the offset at lower offset ranges.

Next considering the effects of variations in the radial directions of the lateral shifts of the input beams, it has been described herein above that such variations in the radial direction of lateral shifts appear as apparent rotational shifts or offsets of the distortions appearing in an output energy profile with respect to the rotational orientation of the Beamforming Transform Function 62T. For example, the circumferential "gradients" of the Non-Symmetric Hotspot Profile 12HP and Non-Symmetric Deficiency Profile 12HD components of the transformation function may be relatively "steep", so that a relatively small rotational offset may have major effects. This is a particular concern when there are, for example, both Hotspot Transform Functions 62HT and Deficiency Transform Functions 62DT components or when the transform functions are otherwise rotationally non-symmetric.

Figure 9D:
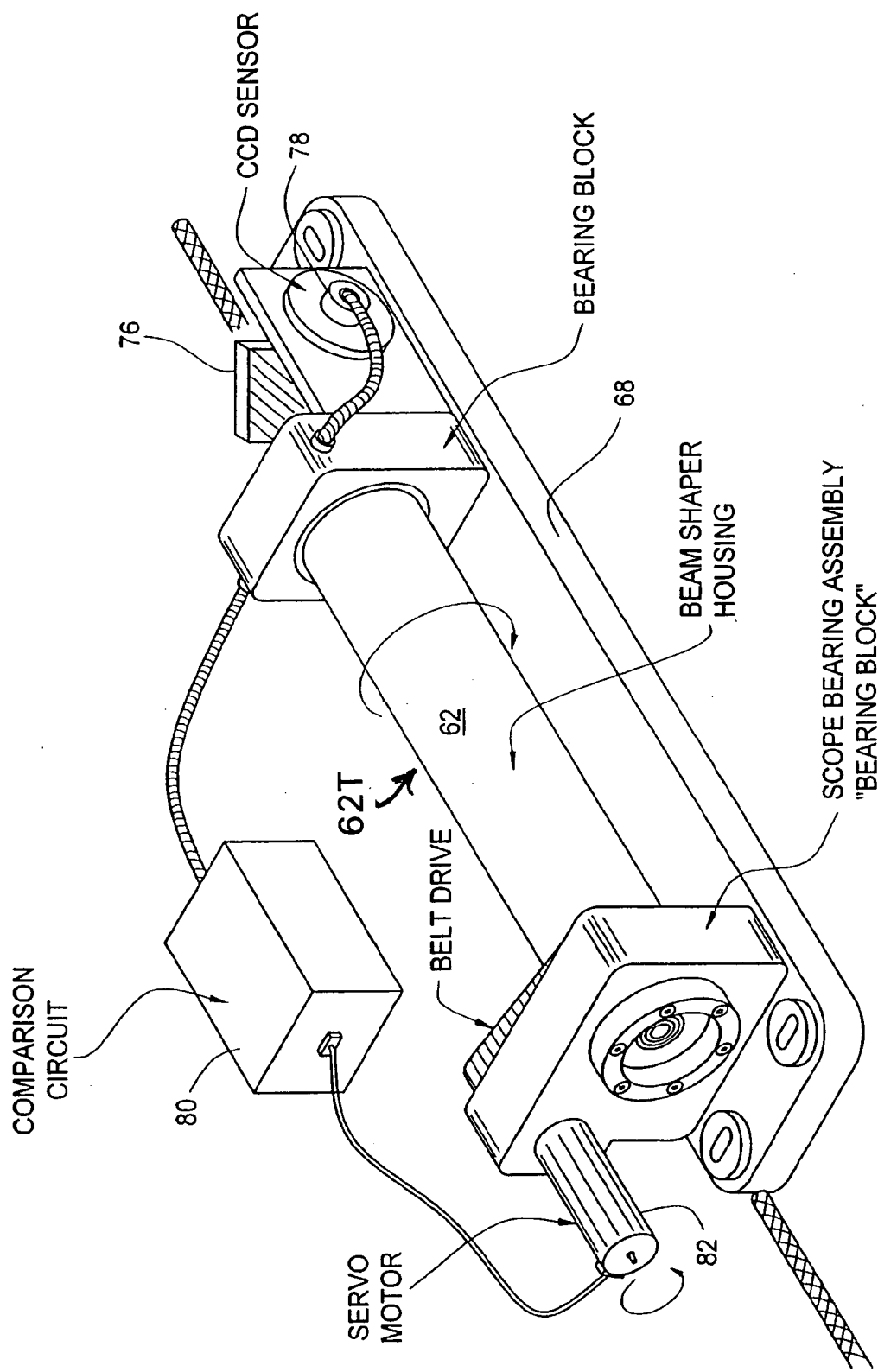
FIG. 9D illustrates a non-symmetric beamforming optical element mounted in an offset mount by rotating bearings.

According to the present invention, the effects of such apparent rotational shifts or offsets between the distortions appearing in the output profile due to a lateral shift of the input beam and the rotational orientation of the Beamforming Transform Function 62T are preferably accommodated by rotation of the Beamforming Transform Function 62T about Optical Centerline 64C. According to the present invention, therefore, and as illustrated in FIG. 9D, the Non-Symmetric Beamforming Optical Element 62 is supported in the Offset Mount 68 by Rotating Bearings 72 that allow Non-Symmetric Beamforming Optical Element 62 to be rotated about Optical Centerline 64C of the Beamforming Transform Function 62T to achieve the optimum rotational relationship between a laterally shifted Input Beam 12I and Beamforming Transform Function 62T.

In this regard, it must also be noted that the non-symmetry of the Beamforming Transform Function 62T together with appropriate shaping of the components of the Beamforming Transform Function 62T will typically allow the Beamforming Transform Function 62T to be adjusted to compensate for various magnitudes of Lateral Shifts 64 as well as to variations in the radial direction of the Lateral Shifts 64.

According to the present invention, therefore, the effect of Beamforming Transform Function 62T on the energy waveforms of an Input Beam 12I and an Output Beam 12O will depend upon both the magnitude and angular direction of a lateral shift of the input beam relative to Non-Symmetric Beamforming Optical Element 62. Further according to the present invention, the effects of variable lateral and rotational offsets of an Input Beam 12O resulting in distortion of the energy profile of the output beam may be compensated to result in an output beam having a desired energy profile by a beamshaping element having an energy profile transformation function that is offset by a fixed amount with respect to the input beam and that is longitudinally rotational with respect to the input beam. Further according to the present invention, the energy profile transformation function may include either or both of a hotspot profile transformation component and a deficiency profile transformation component and an optimum lateral and rotational relationship between an Input Beam 12I and the Beamforming Transform Function 62T to achieve a desired output beam energy profile may be adjustably achieved by adjusting the rotational orientation of the Beamforming Transform Function 62T with respect to the Input Beam 21I.

Example of Beamforming Transform Function 62T
FIG. 9E

In a further aspect of the present invention and as also illustrated in FIG. 9D, the alignment and realignment of a Beamforming Transform Function 62T with respect to an Input Beam 12I subject to variable lateral drift in order to obtain a desired Output Beam 12O energy profile may be readily automated. In this implementation, a partially coated Mirror 76 is mounted in the Output Beam 12O path to reflect an image of the Beam 12 to an Optical Sensor 78, such as a charge coupled device or a sensor made of photo-sensitive resistive materials, that can thereby monitor the energy distribution profile of the Output Beam 12O by its image in the appropriate portion of the spectrum. For example, Optical Sensor 78 may be a two dimensional position sensitive detector as manufactured and distributed by Hamamatsu Corp. The image representing the energy distribution profile of Output Beam 12O is then passed to Processor/Controller 80, which determines whether the Output Beam 12O energy distribution profile is in accordance with the desired profile. If Processor/Controller 80 determines that the Output Beam 12O energy distribution profile does not match the desired profile within acceptable tolerances, Processor/Controller 80 will drive Rotating Bearings 72 through a suitable Drive Mechanism 82 to rotate the Non-Symmetric Beamforming Optical Element 62 until the rotational orientation between Input Beam 12I and Beamforming Transform Function 62T yields the desired Output Beam 12O energy profile.

Figure 10A:
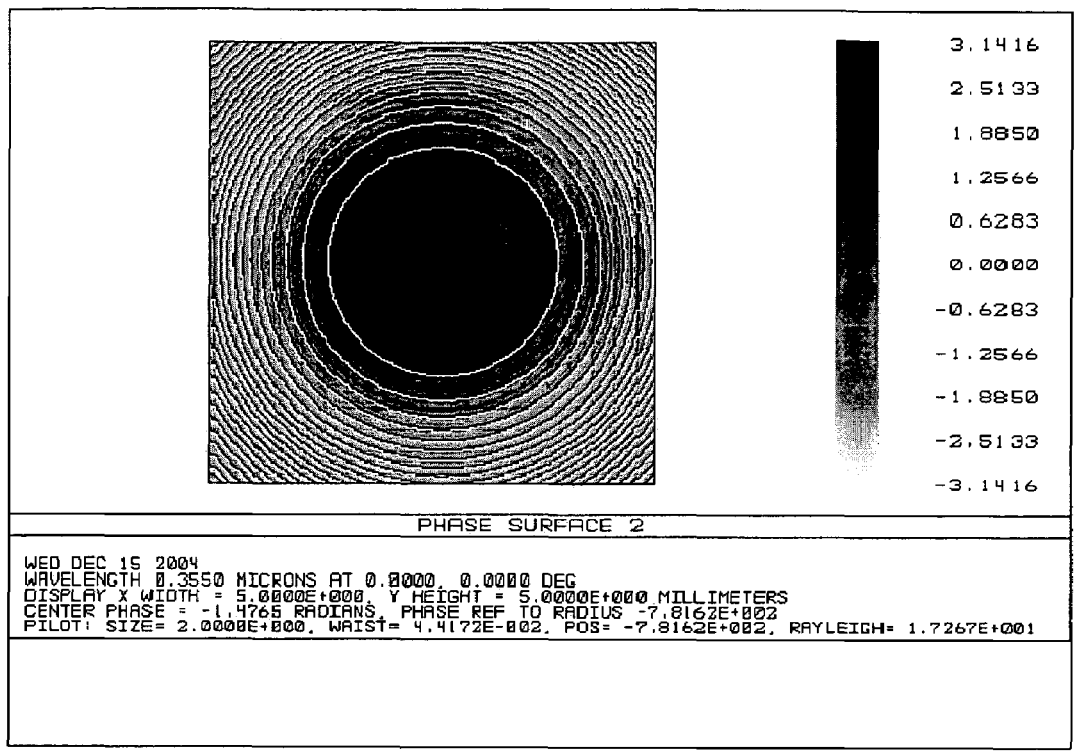
FIGS. 10A, 10B, 10C and 10D are phase surface and corresponding cross-section illustrations of two exemplary non-symmetric beamforming optical elements according to the present invention; and, FIGS. 11A through 11E illustrate cross sectional energy profiles of laser beams according to the present invention.
Figure 10B:
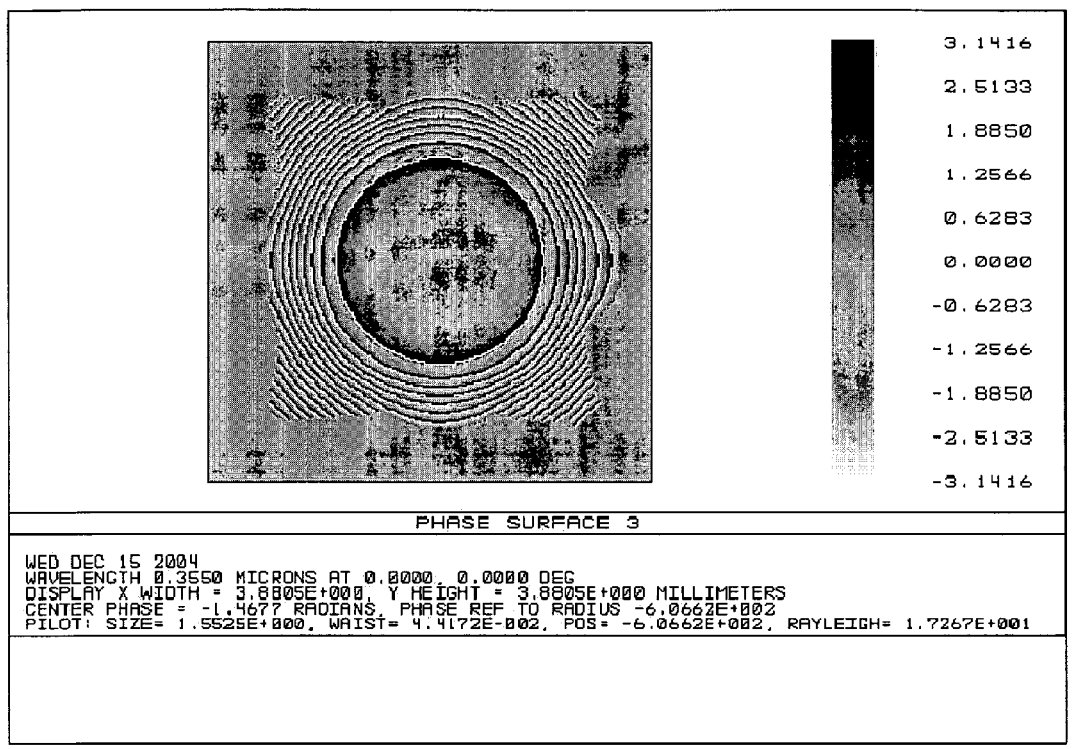
Figure 10C:
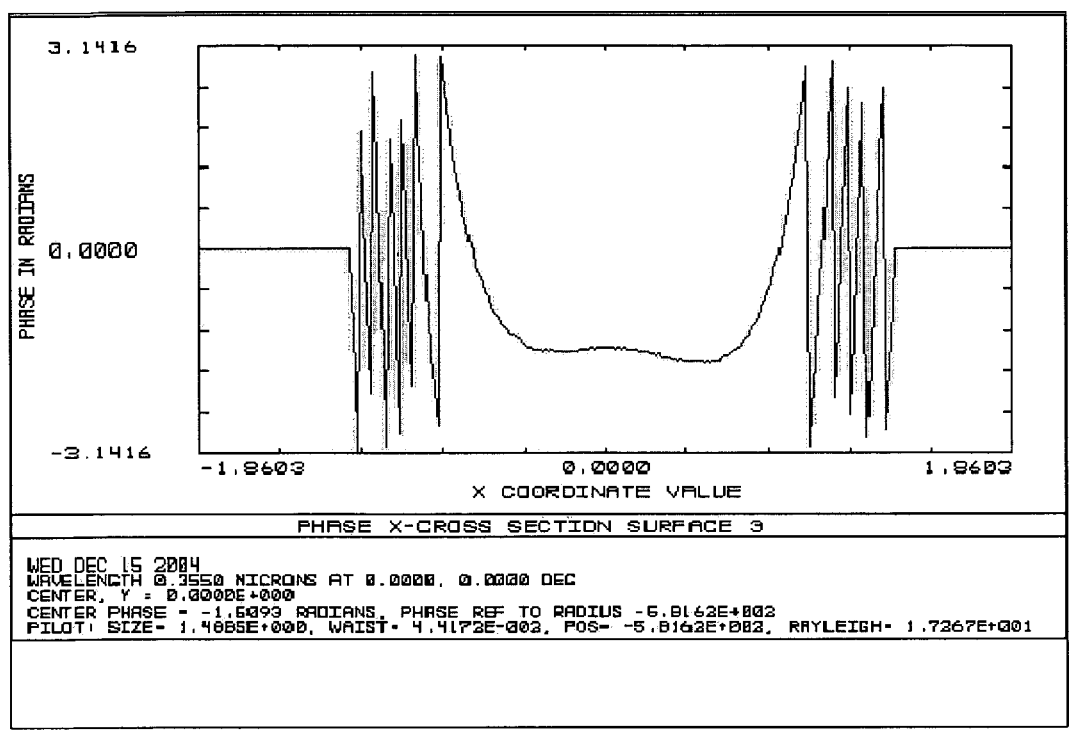
Figure 10D:
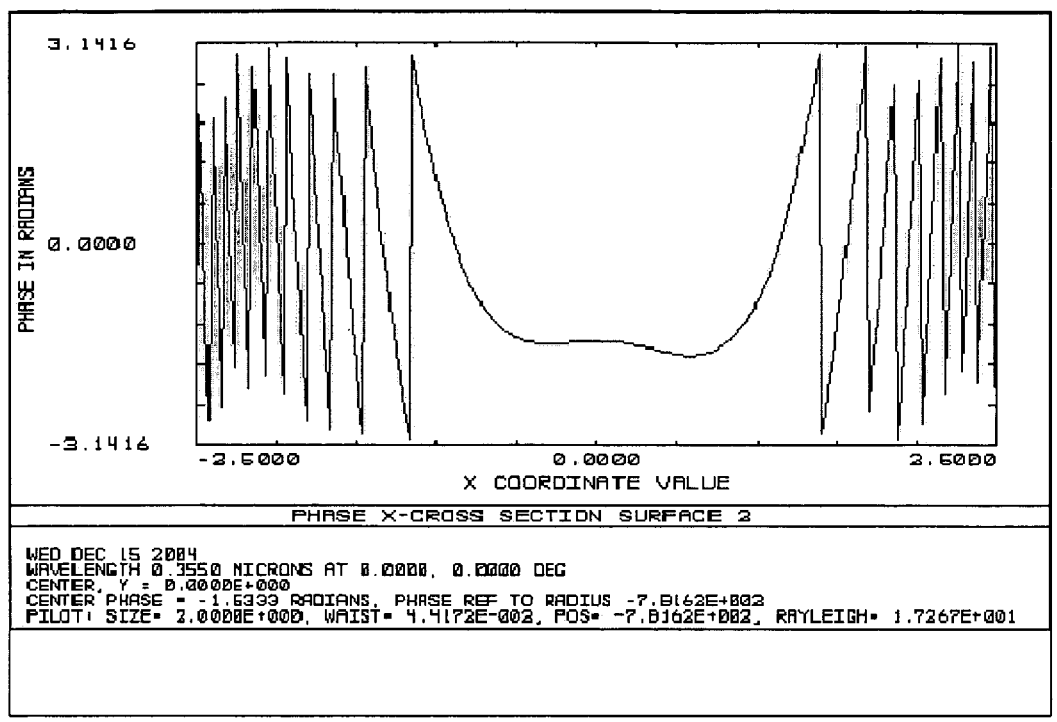

Finally, the present invention as described above is further illustrated by reference to FIGS. 10A and 10B, which are phase surface illustrations of two exemplary non-symmetric beamforming optical elements according to the present invention, and FIGS. 10C and 10D, which are corresponding cross-section profile views.

Figure 11A:
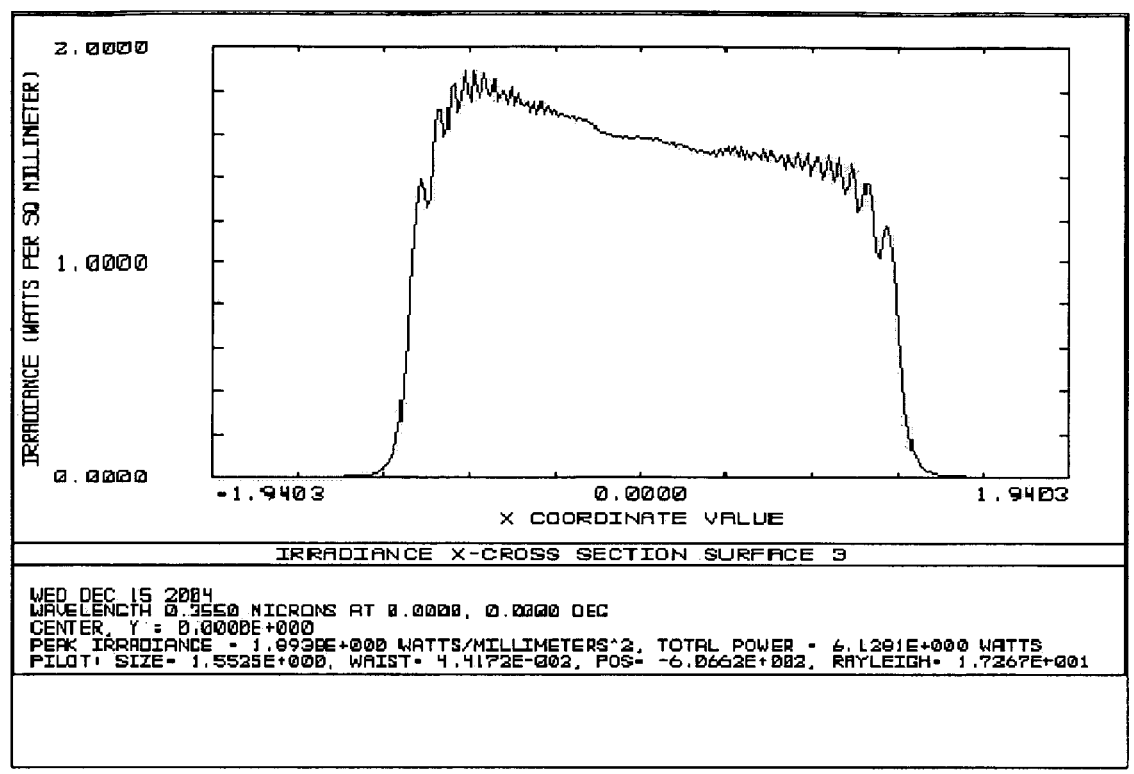
Figure 11B:
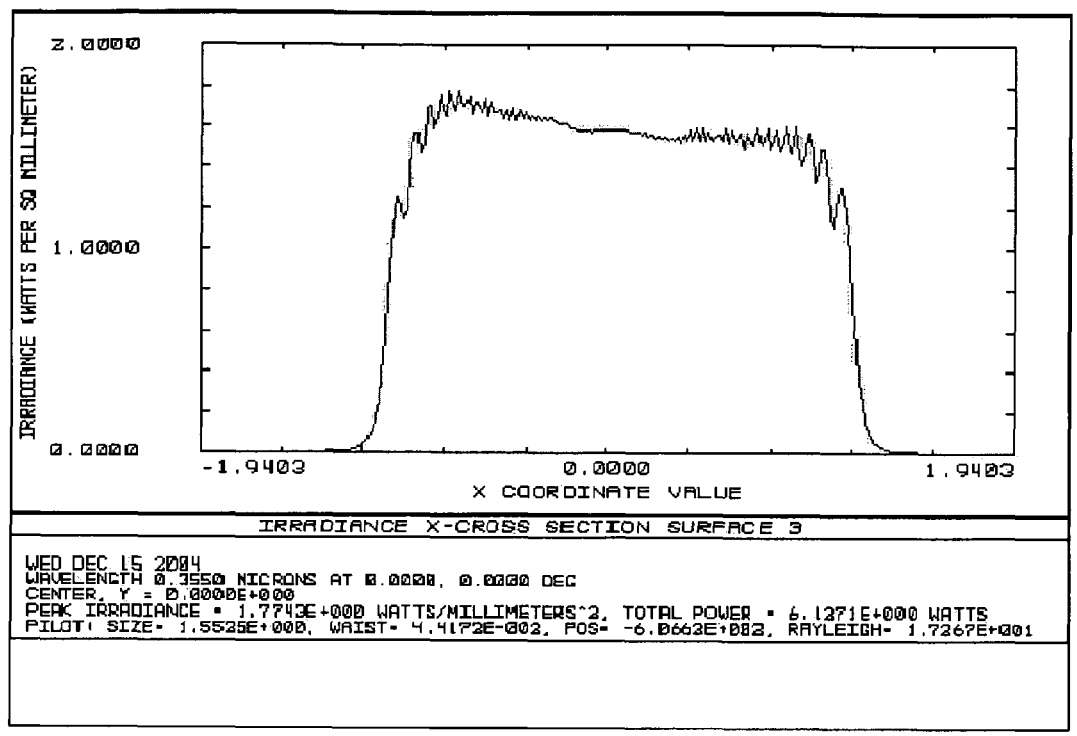
Figure 11C:
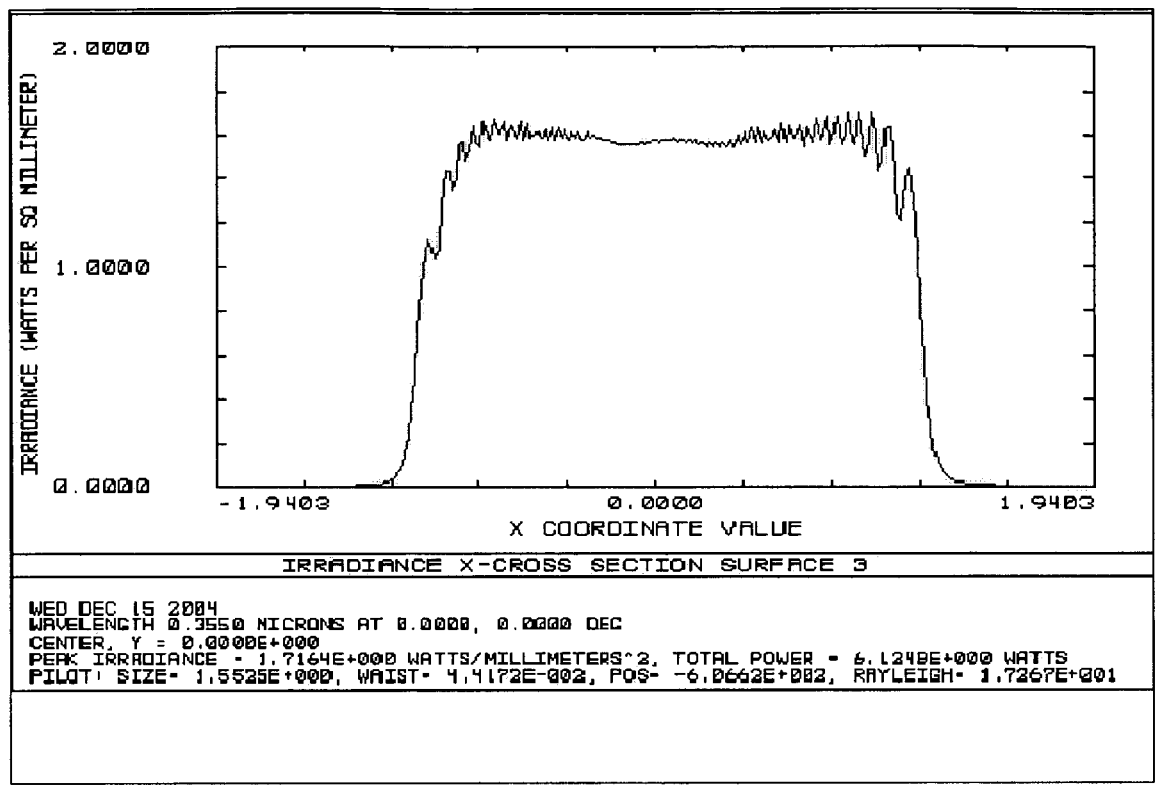
Figure 11D:
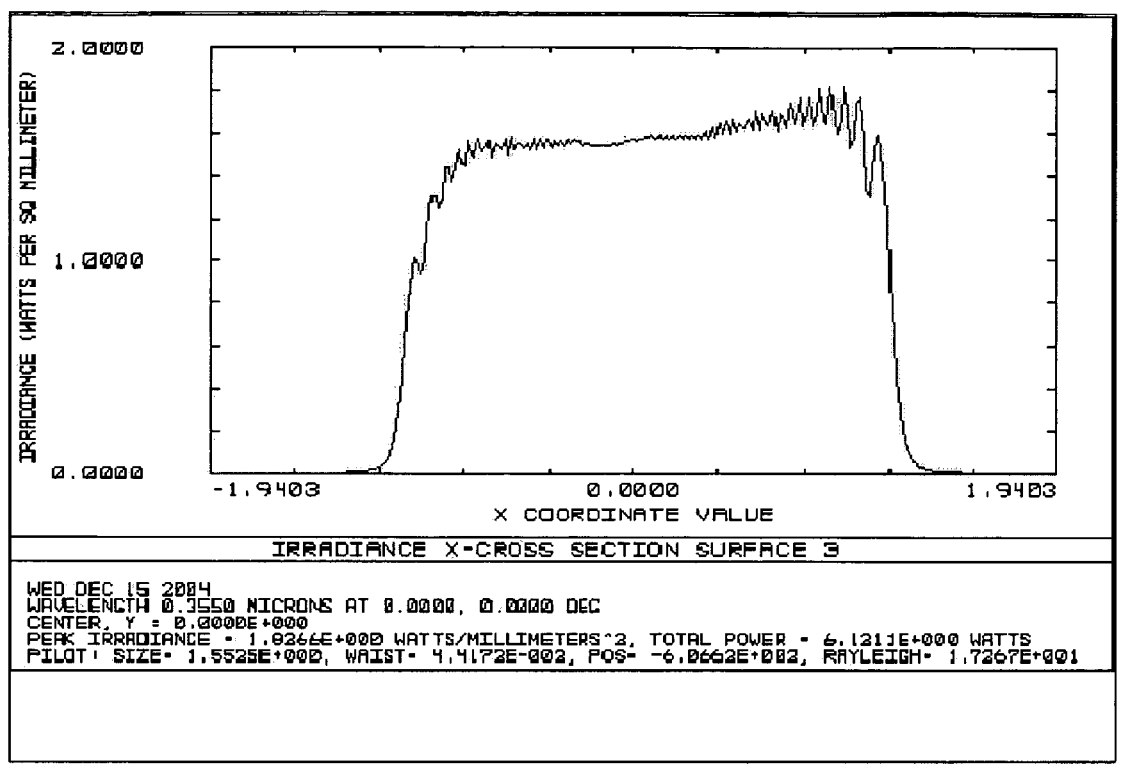
Figure 11E:
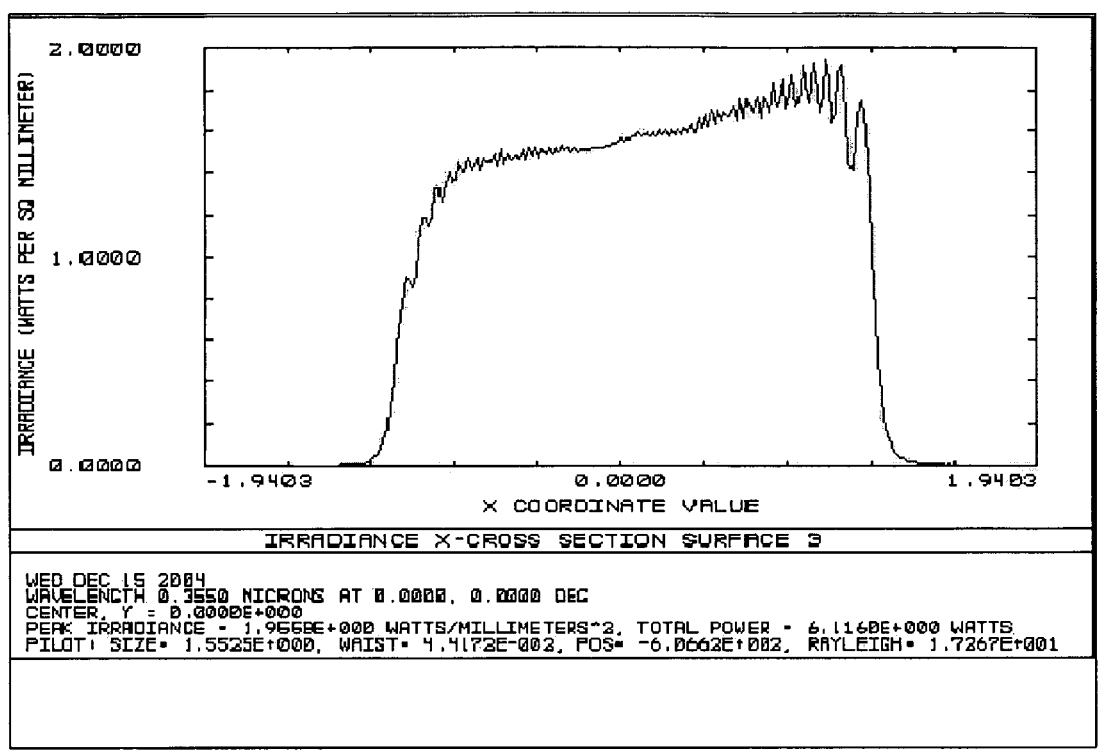

The present invention is still further illustrated by reference to FIGS. 11A through 11E, which illustrate cross sectional energy profiles of laser beams according to the present invention. For example, FIG. 11A illustrates a beam having a hot spot, at the left side, but which has a generally acceptable energy profile. FIG. 11B illustrates a beam drifting to the right and wherein the beam profile improves, due to an optical element of the present invention, the further the beam drifts to the right. FIG. 11C illustrates a beam that has drifted to the right by a distance of 100 microns, which is optimum for the illustrated non-symmetric beamforming optical element. FIG. 11D illustrates the case wherein the beam has continued to drift to the right, by 150 microns, and wherein the right side of the profile as started to "rise" as a result. Lastly, FIG. 11E illustrates a case wherein the beam has drifted 200 microns to the right, which results in a situation that is the mirror of that illustrated in FIG. 11A. These examples therefore illustrate that a non-symmetric beamforming optical element of the present invention as illustrated can accommodate a beam drift of, for example, up to 200 microns , while still providing an acceptable beam profile.

Since certain changes may be made in the above described invention without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A radially non-symmetric beamforming element for transforming an input energy profile of an input laser beam having a beam axis subject to lateral shift that is variable in radial direction and magnitude into an output laser beam having a desired output energy profile, comprising:
   an optical element including
      a profile transformation function, including
         a first profile transformation function for transforming the input energy profile into the desired output energy profile, and
         a profile correction transformation function superimposed on the first profile transformation function for modifying the first profile transformation function to correct distortions in the output energy profile introduced be a lateral shift of the input laser beam.

2. The radially non-symmetric beamforming element of claim 1, wherein the profile correction transformation function includes:
   at least one of
      a deficiency profile transformation function superimposed on the first profile transformation function for superimposing a compensating deficiency energy profile on the desired output energy profile in a location corresponding to a hotspot resulting from a lateral shift of the input laser beam, and
      a hotspot profile transformation function superimposed on the first profile transformation function for superimposing a compensating hotspot energy profile on the desired output energy profile in a location corresponding to a deficiency resulting from a lateral shift of the input laser beam.

3. The radially non-symmetric beamforming element of claim 1, wherein:
   an optical axis of the beamforming element is
      aligned parallel to the beam axis of the input laser beam and is
      offset from an unshifted beam axis of the input laser beam by a distance proportionate to a maximum expected lateral shift of the beam axis of the input laser beam, so that
      the input laser beam passes through the beamforming element parallel to and offset from the optical axis of the optical element.

4. The radially non-symmetric beamforming element of claim 3, wherein:
   the beamforming element is supported in a rotating mount allowing rotation of the profile transformation function about the optical axis of the optical element to allow adjustment of the profile transformation function to a current lateral shift of the input laser beam.

5. A method for transforming an input energy profile of an input laser beam having a beam axis subject to lateral shift that is variable in radial direction and magnitude into an output laser beam having a desired output energy profile, comprising the steps of:
   performing a profile transformation function on the input laser beam, including
      performing a first profile transformation function to transform the input energy profile into the desired output energy profile, and
      performing a profile correction transformation function superimposed on the first profile transformation function to modify the first profile transformation function to correct distortions in the output energy profile introduced be a lateral shift of the input laser beam.

6. The method of claim 5 for transforming an input energy profile of an input laser beam subject to lateral shift that is variable in radial direction and magnitude into an output laser beam having a desired output energy profile, further comprising the steps of:
   performing at least one of
      a deficiency profile transformation function superimposed on the first profile transformation function to superimpose a compensating deficiency energy profile on the desired output energy profile in a location corresponding to a hotspot resulting from a lateral shift of the input laser beam, and
      a hotspot profile transformation function superimposed on the first profile transformation function to superimpose a compensating hotspot energy profile on the desired output energy profile in a location corresponding to a deficiency resulting from a lateral shift of the input laser beam.

7. The method of claim 5 for transforming an input energy profile of an input laser beam subject to lateral shift that is variable in radial direction and magnitude into an output laser beam having a desired output energy profile, wherein:
   the profile transformation function and profile correction transformation function are incorporated into a beamforming element, and
   an optical axis of the beamforming element is
      aligned parallel to the beam axis of the input laser beam and is offset from an unshifted beam axis of the input laser beam by a distance proportionate to a maximum expected lateral shift of the beam axis of the input laser beam, so that the input laser beam passes through the beamforming element parallel to and offset from the optical axis of the optical element.

8. The method of claim 7 for transforming an input energy profile of an input laser beam subject to lateral shift that is variable in radial direction and magnitude into an output laser beam having a desired output energy profile, wherein:

the beamforming element is supported in a rotating mount allowing rotation of the profile transformation function about the optical axis of the optical element, and further including the step of adjusting of the profile transformation function to a current lateral shift of the input laser beam by rotation of the beamforming element.

* * * * *